United States Patent [19]
Koerber et al.

[11] Patent Number: 5,701,472
[45] Date of Patent: Dec. 23, 1997

[54] METHOD FOR LOCATING A VERSIONED OBJECT WITHIN A VERSION TREE DEPICTING A HISTORY OF SYSTEM DATA AND PROCESSES FOR AN ENTERPRISE

[75] Inventors: Paul Donald Koerber, Fountain Valley; Ronald Jay Neubauer, Thousand Oaks, both of Calif.

[73] Assignee: Unisys Corporation, Blue Bell, Pa.

[21] Appl. No.: 489,313

[22] Filed: Jun. 9, 1995

[51] Int. Cl.$^6$ ............................................... G06F 17/30
[52] U.S. Cl. ....................................... 395/619; 395/712
[58] Field of Search .................................. 395/712, 772, 395/701, 619, 614

[56] References Cited

U.S. PATENT DOCUMENTS

| | | | |
|---|---|---|---|
| 5,347,653 | 9/1994 | Flynn et al. | 395/600 |
| 5,557,793 | 9/1996 | Koerber | 395/614 |
| 5,574,898 | 11/1996 | Leblang et al. | 395/601 |
| 5,581,755 | 12/1996 | Koerber | 395/614 |

*Primary Examiner*—Paul V. Kulik
*Attorney, Agent, or Firm*—J. Ronald Richebourg; Mark. T. Starr; Steven R. Petersen

[57] ABSTRACT

The method of the present invention is useful in a computer system having a user interface, a memory, a repository and a database. The method is a repository program executed by the computer system for locating a versioned object within a history of objects stored in the repository. The method comprises the steps of declaring a variable workObject; if the desired variant is equal to the variant of object on which the requesting step is called, setting the workObject to said object; if the desired variant is not equal to the variant of object on which the requesting step is called, setting the workObject to a root object; if the workObject variable is null, pushing a noSuchVariant error onto a notification stack and exiting the method; determining direction for searching the version tree using the desired version and the version of workObject; if the workObject is visible, returning said workObject as the desired version; if the workObject is not visible and the desired version is equal to zero, determining if the workObject has previous versions; if the workObject has no previous versions, returning a null object.

16 Claims, 14 Drawing Sheets

METHOD FOR LOCATING A VERSIONED OBJECT WITHIN A VERSION TREE DEPICTING A HISTORY OF SYSTEM DATA AND PROCESSES FOR AN ENTERPRISE

FIELD OF THE INVENTION

The present invention relates in general to the field of repository databases and in particular to a method for locating versioned objects within a version tree.

BACKGROUND OF THE INVENTION

The storage and manipulation of data records or objects within a database application is well known in the prior art. A database allows one to store information in it; and it does not necessarily have any special meaning associated with the things that are stored in the database. A repository not only uses the database as a data store, but it is a layer above a database. A repository has information about the things stored in the database. A repository is like a card catalog that is found in the library, with the library being analogous to the database.

With the advent of repositories, improvements in the accessibility of data within databases has improved. However, as these repositories have become larger and more complex a method is required to not only maintain a history of system data and processes for an enterprise, but also a method for locating versioned objects in a version tree depicting such a history of system data.

The version service enables users to record changes to objects over time and thus to maintain information about the previous states of these objects. Each of these states is maintained in a separate physical object in the repository. As the repository is used over time the number of evolutionary states of a versionable object increases. Thus, it becomes more and more difficult to find objects within the version tree as the number of historical states of the object increases. For example, at some point in time a variant branch was created. Over time multiple historical states and later sub-variant branches from this branch were created. Consequently, the version tree becomes more and more complex, which increases the complexity of locating a versioned object. The method of the present invention provides the user of the repository with the ability to accomplish the above-stated results with a minimum of operation requests.

BRIEF SUMMARY OF THE INVENTION

It is therefore an object of the present invention to provide an improvement to a repository system.

It is another object of the present invention to provide an improved repository which supports a method for locating a versioned object within a version tree depicting a history of system data and processes in an enterprise.

The method of the present invention is useful in a computer system having a user interface, a memory, a repository and a database. The method is a repository program executed by the computer system for locating a versioned object within a history of objects stored in the repository. The method comprises the steps of declaring a variable workObject; if a desired variant is equal to the variant of object on which the requesting step is called, setting the workObject to said object; if the desired variant is not equal to the variant of object on which the requesting step is called, setting the workObject to a root object; if the workObject variable is null, pushing a noSuchVariant error onto a notification stack and exiting the method; determining direction for searching the version tree using the desired version and the version of workObject; if the workObject is visible, returning said workObject as the desired version; if the workObject is not visible and the desired version is equal to zero, determining if the workObject has previous versions; if the workObject has no previous versions, returning a null object.

BRIEF DESCRIPTION OF THE DRAWINGS

FIGS. 9A and 4B combined form a flow chart illustrating the steps of a process for finding the root object of a version tree, or a root object of a variant branch, starting from any object in the tree.

DETAILED DESCRIPTION

Before proceeding with a detailed description of the method of the present invention a background discussion of repositories in which the present invention is useful would be helpful. In general, a repository enables the user to store, manage, share and reuse information about the information system in which the repository is used. The repository enables the user to store more than just the data that is processed by an information system. For example, definition data stored in the repository may be information about the development of applications; including descriptions of data, programs and system objects. It may also include information about relationships among data, programs and system objects; as well as the semantics and use of the information.

Examples of definition information might include the files and programs that form a salary administration application. This application might define the minimum and maximum salaries at a given level. Another example is management information used to manage and maintain definition information. Management information also describes who can use definition information and when, where and why the information is used. For example, the salary administration application might be accessible only to a select group of repository users.

Yet another example is operational information about the environment in which the user operates. Examples of this information include system configuration, backup information and schedules.

Figure 1:
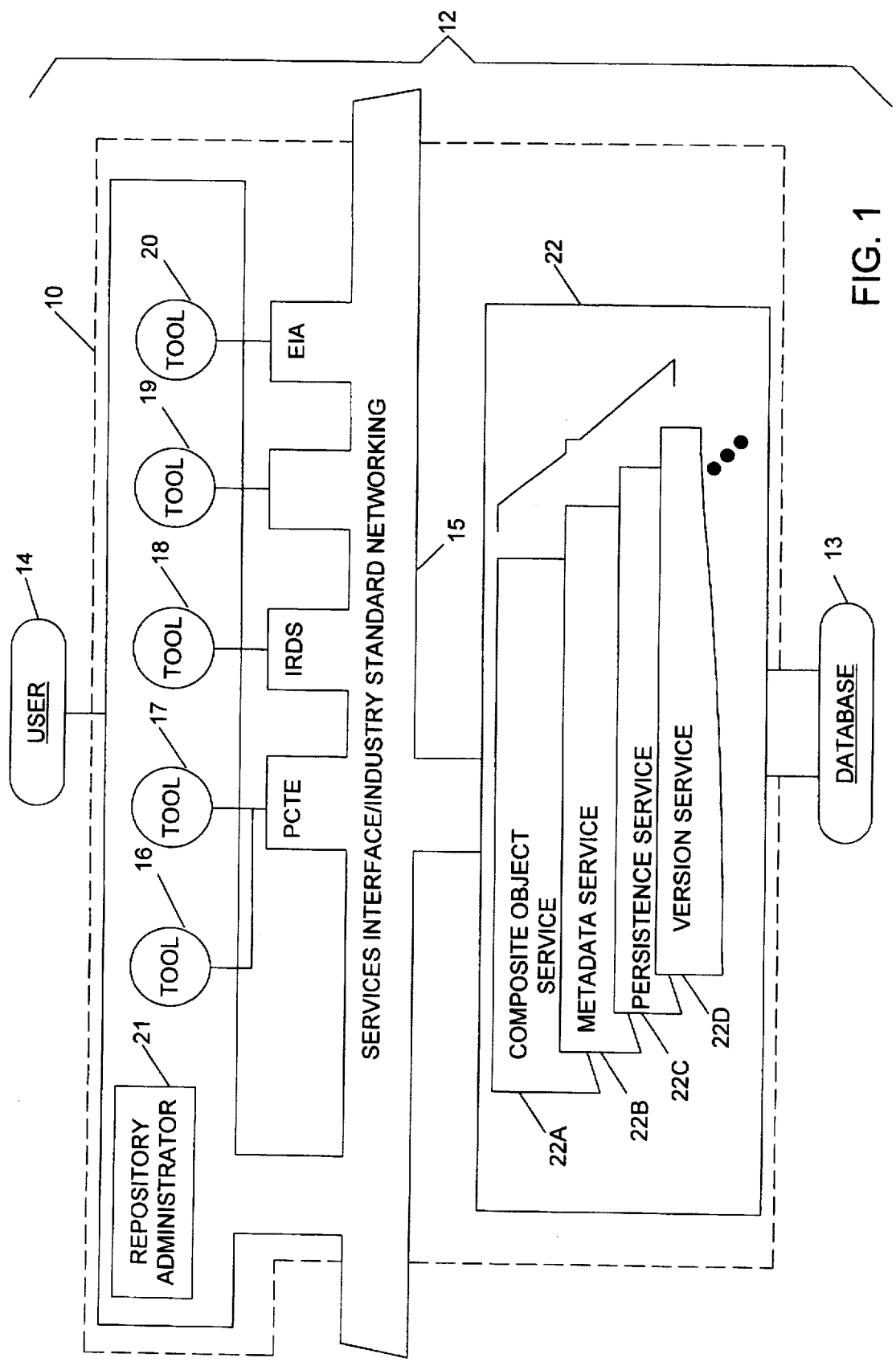
FIG. 1 is a block diagram of a computer system showing the various components of hardware and software that support a repository employing the method of the present invention.

Referring now to the drawings and FIG. 1 in particular, a block diagram is shown of a computer system 12 including a repository 10 that may use the method of the present invention. The repository 10 is illustrated as being supported by or a part of an information system 12 having a user interface 14. Tools 16–20 (such as CASE tools), which are integrated within the repository 10, are coupled to a services interface 15. The tools 16 and 17 are coupled to the interface 15 by means of an interface agent identified as Portable Common Tool Environment ("PCTE"), tool 18 is coupled to the interface 15 by means of an Information Resource Dictionary System ("IRDS") and tool 20 is coupled to the interface by means of an Electronic Industry Associates ("EIA") interface agent. The point here is to illustrate the flexibility of use of a variety of tools and interface agents with the repository 10.

An administrator 21 manages the repository 10, the database 13 and the environment around the repository. The administrator 21 is typically a work station that can manage a single repository or a network of repositories.

A service library 22 provides the functionality that enables the user to store, manage and reuse repository information. Examples of services within the library 22 are Composite Object Service 22A, which is disclosed in a U.S. Pat. No. 5,557,793 assigned to the assignee of this application and entitled IN AN OBJECT ORIENTED REPOSITORY, A METHOD FOR TREATING A GROUP OF OBJECTS AS A SINGLE OBJECT; and MetaData Service 22B, which is disclosed in a U.S. Pat. No. 5,644,764 also assigned to the assignee of this application and entitled A METHOD FOR SUPPORTING OBJECT MODELING IN A REPOSITORY. Another library service, Persistent Service 22C, deals with definition, tracking and maintenance of objects that continue to exist beyond the execution of a particular tool or of the repository itself. An exemplary persistence service is disclosed in patent application Ser. No 08/506,647 entitled A METHOD FOR GENERICALLY MANIPULATING PROPERTIES OF OBJECTS IN AN OBJECT ORIENTED REPOSITORY, also assigned to the assignee hereof. Yet another library service, Version Service 22D, is disclosed in U.S. Pat. No 5,581,755, assigned to the assignee of this application and entitled A METHOD FOR MAINTAINING A HISTORY OF SYSTEM DATA AND PROCESSES FOR AN ENTERPRISE. The method of the present invention is a feature of the version service 22D. It is noted that many more types of library services may form a part of such a repository, the details of which are beyond the scope of this disclosure.

The repository employing the method of the present invention provides a client/server architecture in which clients, i.e. tools 16–20, request services form the server, i.e. the repository 10 and its service library 22. In return, the repository and its service library 22 respond to requests from client tools 16–20. A repository client is software that accesses or modifies information that is maintained by the repository. The repository client uses the service library 22 (i.e., the server), which includes software integrated into the repository to manage repository information and provide services to users of that information. It is noted that software in the repository can act both as a repository client when the software is requesting a service from some other repository software and as a repository server when the software is providing a service to some other repository software.

It is pointed out that a SPARC system manufactured by Sun Microsystems, Inc. of Mountain View, Calif., was used for executing one embodiment of the method of the present invention, which method was written in the C++ programming language.

As a repository user, one can access the information in the repository through the tools 16–20 that have been integrated within the repository. In the context of a repository, a "tool" is any application software that creates, modifies or uses information in the repository. Tools primarily use the repository for sharing information with other tools and tool users. For example, a COBOL compiler and a user-interface tool can share the definition of a data structure. Tools also benefit from using the repository services that provide features such as a version control and network distribution. A wide variety of tools serving many diverse purposes can use a repository. A catalog of such tools includes integrated computer-aided software engineering (CASE) and fourth generation language (4GL) tools, enterprise modeling tools, analysis and design specification tools, project planning tools, word processors, graphics tools, source code editors, compilers, linkers, debuggers, etc.

The method of the present invention, which is a feature of the version service 22D, enables the user to locate a versioned object within a complex structure previously stored in the repository (e.g., a version tree). The version service 22D enables a user to record changes to objects over time and thus maintain information about the previous states of these objects. In other words, version information provides a history of the system, data and processes for an information system.

At this juncture of the description several definitions would be helpful.

Types

A type is a template that describes a set of features—the state and behavior—that an object or another type can possess. A type defines a pattern that can be used to create or identify objects; it does not contain the actual object. A model is defined by a hierarchy of types.

Most types define the structure of repository objects as the features the objects can have. Data types define the values associated with the features. (Data types are also known as primitive types.) For example, data types are used to define attribute values, operation parameters, and operation return values. The values represented by the data types do not exist as separate objects in the repository. Instead, they are always sorted as part of a repository object.

Persistent types define objects that continue to exist within the repository beyond the execution of a particular tool or of the repository. These persistent objects are essentially permanent—they remain in the repository until they are explicitly deleted by users. The majority of repository types are persistent.

A transient type defines a temporary object that will be automatically deleted when the function or program in which the object was created exits or terminates. Transient types are provided in the model to support exchange of data between an application and the repository.

A type that can be used to define other types and objects is said to be instantiable. Objects derived from a type are called instances of that type. Types derived from a type are called subtypes of that type. Instances and subtypes of a type inherit the features—attributes, references, and operations—defined for that type. The repository User type is an example of an instantiable type. A type that is used to define only other types and not objects is said to be abstract.

A type that is derived from one or more other types is called a subtype. The definition of a subtype identifies the type or types from which it is derived. A type from which a subtype is derived is called the supertype. The definition of a supertype identifies the subtypes derived from it. A type cannot be a supertype or a subtype of itself. A subtype inherits all the features of its supertype. It can be customized by adding new features. The structure created by deriving types from other types is called a hierarchy. The hierarchy shows the relationship of the supertypes and subtypes. A hierarchy has a single base type. The base type is the highest supertype in the hierarchy.

In addition to features defined specifically for a subtype, each subtype acquires the features defined for the supertype. This trait is called inheritance. For example, managers have all of the features defined in Manager, and they inherit all of the features of Employee as well. Hence, if the Employee type has a feature such as name, we can ask for the name of a manager since Manager is a subtype of Employee.

Features

A feature defines some element of either the state or the behavior that objects can possess. A feature is defined for a type, but applied to the corresponding objects. The repository has two kinds of features: operations and properties. For example, the Employee type might define the features name, birthDate, salary, and setSalary. Each employee object is subsequently considered to possess these features. That is, each employee has a name, a birth date, and salary. The employee's salary can be modified by using the setSalary feature.

There are two basic categories of features: properties and operations. Properties define state. For example, the salary feature is a property that defines an employee's current salary. Operations define behavior. For example, the setSalary feature is an operation that defines the mechanism for changing an employee's salary.

Properties

A property is a feature that represents a state that objects can possess. (In some models, properties are called instance variables.) A property can represent either a single value or a set of values. Properties are further divided into attributes, whose values are embedded within the owning objects, and references, whose values are independent objects.

The repository supports the following kinds of properties:

Attribute

A property for which the value is embedded within the owning object. For example, an employee's social security number can be defined as an attribute whose value is stored as a string within the employee object.

Reference

A property for which the value is maintained outside the owning object. For example, the employee's manager can be defined as a reference that identifies a separate employee object that represents the manager.

Every property has a domain that identifies the objects that the value of the property can hold. The domain is defined as a type. Objects that are instances of the type are legal values for the property. For example, the domain of the boss property of the Employee type might be specified as the Manager type. Therefore, only a manager object can be designated as the boss of an employee.

When an object is first created, none of its properties have values until they are implicitly assigned a default value or explicitly assigned a value by the construct operation. Until a property has a value it is considered undefined. For properties that are references, the value is considered null. The state of being null is not a value itself. Rather, it means that no value exists.

A property for which the value is embedded within the owning object is called an attribute. Such a property typically is used for simple values that are not shared between multiple owning objects. For example, the Employee property birthDate is simply a Date object—that is, the domain of the birthDate property is the Date type. If one employee's birthDate property is changed, the change does not affect other employees whose birthDate property is the same date. Consequently, each employee object should use a "private" date object that is embedded within it—that is, as an attribute.

A property for which the value is maintained outside the owning object is called a reference. For a reference, the owning object points to the value object. One reason for defining a property as a reference is to allow object sharing. A reference enables two or more owning objects to have the same value for a property. All owning objects can point to the same value object. For example, if two employees have the same manager as a boss, they share the same manager object. Consequently, any changes to the manager (such as changing his or her name) are reflected when the boss reference is accessed for all employees that have that boss.

A property that has one value for each object is said to be single valued. For example, each employee has one name and one birth date. A property that has more than one value for each object is said to be multi-valued. For example, each manager manages multiple employees, so the staff property for a manager object must be able to reference multiple values. A multi-valued property is defined by specifying a collection as its domain. A collection represents a set of values. A collection provides the ability to count the values defined for a multi-valued property, to add new values to the property, and to delete existing values.

The repository supports several types of collections, each of which organizes elements in a different manner. This capability enables the user to:

Store and retrieve the elements in a special order; and,

Search for elements in a special way.

The collection types supported by the repository are summarized in the following table:

TABLE I

| Type | Description |
| --- | --- |
| Array | Creates a dynamic array of objects in which an integer index can be used to access array members. An array can contain duplicate objects. |
| List | Creates an ordered collection of objects. A list can contain duplicate objects. |
| Set | Creates an unordered collection of objects. Objects in a set must be unique. |

Operations

An operation is a feature that represents a behavior that objects can possess. An operation can be thought of as a function: it has a name, an optional set of parameters, and an optional return type. Like properties, operations are applied to each object within the owning type. Consequently, an operation is generally invoked in the context of a specific object.

An operation can have parameters that identify information a caller must provide when invoking the operation.

If an operation has no parameters, a caller merely invokes the operation for the desired object. For example, consider the following features:

TABLE II

| Type | Feature | Domain/Return Type |
|---|---|---|
| Employee | birthDate (attribute) | Date |
| | age (operation) | Integer |

As shown, the birthDate attribute has a domain of Date. Age is an operation (with no parameters) whose return type is Integer. The purpose of age is to compute an employee's current age (in years) from his or her birth date. Because the age operation is invoked for a specific employee, it is able to obtain the value of that employee's birthDate attribute, make the necessary computation, and return the appropriate integer without requiring parameters. When an operation has parameters, each parameter has semantics similar to those of properties. Each parameter has a name, a domain type, and a set of options that can be used to affect the behavior of the parameter. The following table shows an example of an operation, defined for the Employee type, that has parameters:

TABLE III

| Operation | Parameter | Parameter Domain | Parameter Options |
|---|---|---|---|
| setSalary | amount | Real | REQUIRED |
| | authorizedBy | Manager | REQUIRED |
| | effective | Date | DEFAULT today's date |

The setSalary operation has three parameters:

The amount parameter is a Real number (floating-point) that is required. Therefore, the caller must specify a value for this parameter.

The authorizedBy parameter is a Manager object that also is required.

The effective parameter is a date parameter that is not required. However, if the caller does not specify a value for this parameter, the current system date is used by default.

A multi-valued parameter is a set, or collection, of values. Such a parameter is useful when the operation must operate on several objects even though it is invoked in the context of a single object. An operation optionally can return an object when it completes processing, just as a program function can return a value. An operation that returns an object is called typed because it has a return type specified. An operation that does not return an object is called un-typed because it does not have a return type specified. A return type must be one of the types recognized by the repository. An operation can return a set of objects by specifying a collection as its return type.

An operation can be defined for a type and then redefined for each subtype of the original type. This process is called overriding an operation.

when an operation is overridden, a subtype that inherits the operation has a separate method that redefines the functionality of that operation. The technique that the repository uses to choose which method to call for a given operation is called dynamic binding.

Dynamic binding (also called polymorphism) means that the repository chooses the method that is most specific for a given object and operation. The most specific method is the one defined in the lowest subtype of which the object is an instance.

For example, assume setSalary is an operation defined for the Employee type. An employee object can be an instance of the Employee type or one of its subtypes.

If you call the setSalary operation for an object that is an Employee instance, the repository selects the method associated with the setSalary operation defined for the employee type.

If you call the setSalary operation for an object that is a Manager instance, the repository selects the method associated with the setSalary operation as it is redefined for the Manager type, if the Manager type does not redefine the setSalary operation, the repository selects the method associated with the setSalary operation defined for the Employee type as the immediate supertype of the Manager type.

You can define an operation to be called with different sets of parameters. For example, you might define the setSalary operation to be called with only an amount parameter or with both an amount parameter and an effectiveDate parameter.

Each combination of parameters that an operation can accept is called a signature. To define multiple signatures for an operation, you define the operation more than once in the same owner type and use the desired signature for each definition.

Methods

The operations defined for a model form an interface that can be seen by a caller. Separate from this definition, each operation must be implemented by a module of code called a method. Methods are typically written as separate functions and bound into a set of code libraries. The method code library name for each operation is then identified to the repository as part of the definition of the operation.

When a caller invokes an operation, the request is received by the repository, which finds and calls the appropriate method. The operation passes to the method the appropriate parameters. When a method is called, it can then act as a caller and call back into the repository to invoke other operations. Consequently, a method can be thought of as a specialized kind of application program.

Objects

An object is an abstract representation of a real-world concept or thing-such as a person, a software package, or an event—that is stored in the repository. In the repository, the state of an object is represented by the values of the properties defined for the type. For example, the state of an integer is its numeric value. The state of a person is its name, birthDate, spouse and so on.

The behavior of an object is the set of functions that the object can perform. In the repository, the behavior of an object is represented by the operations defined for the owner type. A characteristic of object behavior is the ability to return some of its state to a requester. For example, the object person can return its name. For this reason, some object models describe object behavior as the set of messages that an object can receive and respond to. One example of object behavior is the capability an integer has to perform such functions as addition, square root and absolute value.

A Component Object is a versioned object (i.e., a particular historical state of an object) that is part of a composite object. The relationship of the component object to the composite object is defined by a composition relationship. A component object can itself be a composite object. In this case, the component object contains other component objects related to it by composition relationships. A component object can belong to several composite objects. This feature promotes sharing of objects in the repository.

A Composite Context is a type that defines the scope of a composite hierarchy. The composite context identifies the top object for the hierarchy and the ghost objects that were created while the context was the current composite context. The term ghost as used herein means a value associated with a changeable object. Objects with ghost status can only be viewed in certain situations, i.e. they are only visible in the context in which they were created.

A Composite Hierarchy is a tree structure composed of a composite object and its component objects. The hierarchy also includes the component objects for any component object that is itself a composite object. Thus, this structure defines the component objects of the top, or root object, the components of those components, and so on to the bottom of the hierarchy.

A Composite Object is a versioned object (i.e., for which at least one composite relationship is defined thus allowing the object to have components. A composite object can be thought of as owning its component objects. Some examples of these are: a car engine-the component objects include spark plugs, wires and pistons; a program-the component objects include files, record layouts and modules; a menu-the component objects are the various selections on the menu.

A Composite Relationship is the relationship that links a composite object to its component objects. The relationship between a car engine and its parts-spark plugs, pistons, wires and so on-can be used to illustrate a composite relationship. The car engine and its components can be treated as a single object, yet each of the parts can be accessed individually.

The term Visibility is used with versioned objects whose reserveStatus value is ghost. A ghost object is visible only in the composite context in which it was created. When this composite context is the current context, one can change the attributes of the ghost object, add or remove an object from the attributes of another object and so on.

Figure 2:
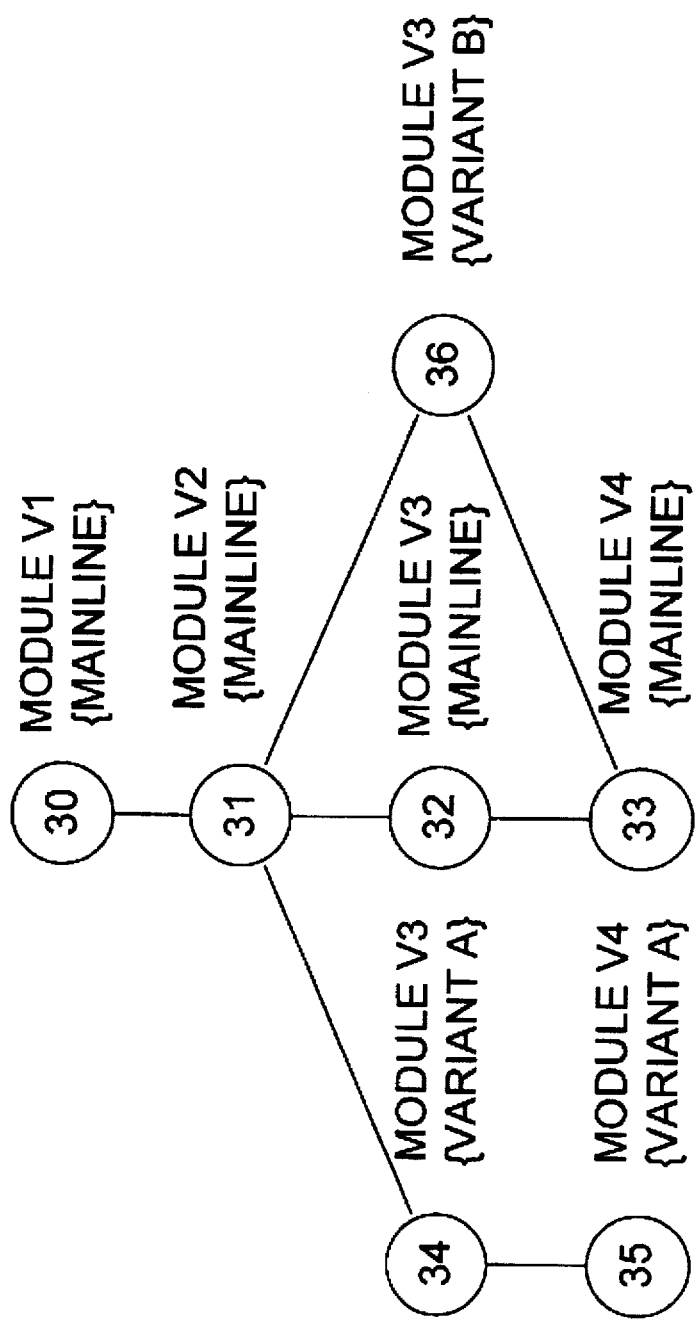
FIG. 2 is a version graph for a versionable repository object called Module.

A Versionable Object is a repository object for which the version service records state changes over time. A Versioned Object is a repository object that represents a particular historical state of a versionable object. In FIG. 2 each circle stands for a versioned object that represents a particular state of Module.

Referring now to FIG. 2, a version tree is shown which represents the historical states of a versionable object in the repository. In particular, FIG. 2 shows an example of a version tree for a versionable repository object called Module. The following definitions will be helpful in understanding this invention when taken in conjunction with the tree shown in FIG. 2.

A Variant Branch, which represents a single line of development, is a subset of versioned objects in a version graph. The variant branch is a linear path that shows the history of changes from one versioned object to another for a particular line of development. In FIG. 2, the version tree has three variant branches-mainline, variant A and variant B. The mainline branch is made up of objects 30 through 33. The variant A branch is the path including objects 34 and 35 (labeled Module v3 {variantA} and Module v4 {variantA}). The variant B branch is the path including object 36 (labeled Module v3 {variant B}).

A Variant is a versioned object on a variant branch. A version graph can contain multiple variants at the same level of ancestry. The terms Variant and Versioned Object are interchangeable. In FIG. 2 there are two variants of Module-object 35 on the variant A branch and object 33 on the mainline branch-as the final level (v4) represents in FIG. 2. The method of the present invention identifies each variant by its version number and its variant name.

A Version Number is the first of two identifiers used by the method of this invention to distinguish a versioned object in a version tree. This number is an integer that represents a level of ancestry in the version tree. In FIG. 2 the version number is represented by a lowercase "v" followed by an integer. For example, the root Module is labeled v1. At the second level of the tree, the object derived from the root object is labeled v2.

The Variant Name is the second of two identifiers used by the method of this invention to distinguish a Versioned Object in a version tree. This name is a string that distinguishes a particular variant branch in the version tree. The Variant Name supports the maintenance of parallel lines of development. A Versioned Object can have many descendant variants representing different lines of development. In FIG. 2 the Variant Name is shown in braces. For example the main line of development is labeled {mainline}.

The method of the version service 22D uses the check-in/check-out model for creating and controlling versions of objects. This model requires that a versioned object be checked out before it can be modified. This step places the object in a state in which it can be modified. When the modifications have been completed the versioned object must be checked back in. As the objects are checked in and out, the reserved status changes. The version service enables one to determine whether the history of certain state-changes to versionable objects should be retained.

Specifically, the version service 22D enables one to modify properties defined as not significant without checking out the object. If one does not check out the object, the version service does not maintain a record of the changes. It should be pointed out however that the version service automatically checks out an object if a user makes a change to a significant property of that object.

The reserve status of a versioned object indicates the visibility and availability of the object for different operations. The reserve status is determined by the value of the reserveStatus property defined for the repository VersionedObject type.

The reserve status of a versioned object can be one of the following values:

TABLE IV

| Value | Description |
| --- | --- |
| available | indicates that the versioned object has no successor objects and therefore can be reserved. |
| readOnly | indicates that the versioned object has a successor object on the same variant branch and therefore can be reserved only if the user defines the variant parameter for the reserve operation. |
| source | indicates that the versioned object has successor objects, but that none of the successor objects are on the same variant branch as the versioned object. Therefore, the variant name is optional when reserving the object. |
| ghost | indicates that the versioned object can be modified. The object is visible only if it is checked out in the current composite context. |

The reserve status is set when the following operations defined for the repository VersionedObject type are used:

TABLE V

| Operation | Description |
| --- | --- |
| merge | Checks out a versioned object by merging the current versioned object with a designated object. |
| replace | Checks in a previously reserved versioned object and sets the reserveStatus property value to available. |
| reserve | Checks out a versioned object by creating a copy of the object, and sets the reserveStatus property value of the copy to ghost. |
| unreserve | Deletes the ghost object for a previously reserved versioned object. If there are no more next versions, the operation sets the reserveStatus property value of the object to available. |

Figure 3:
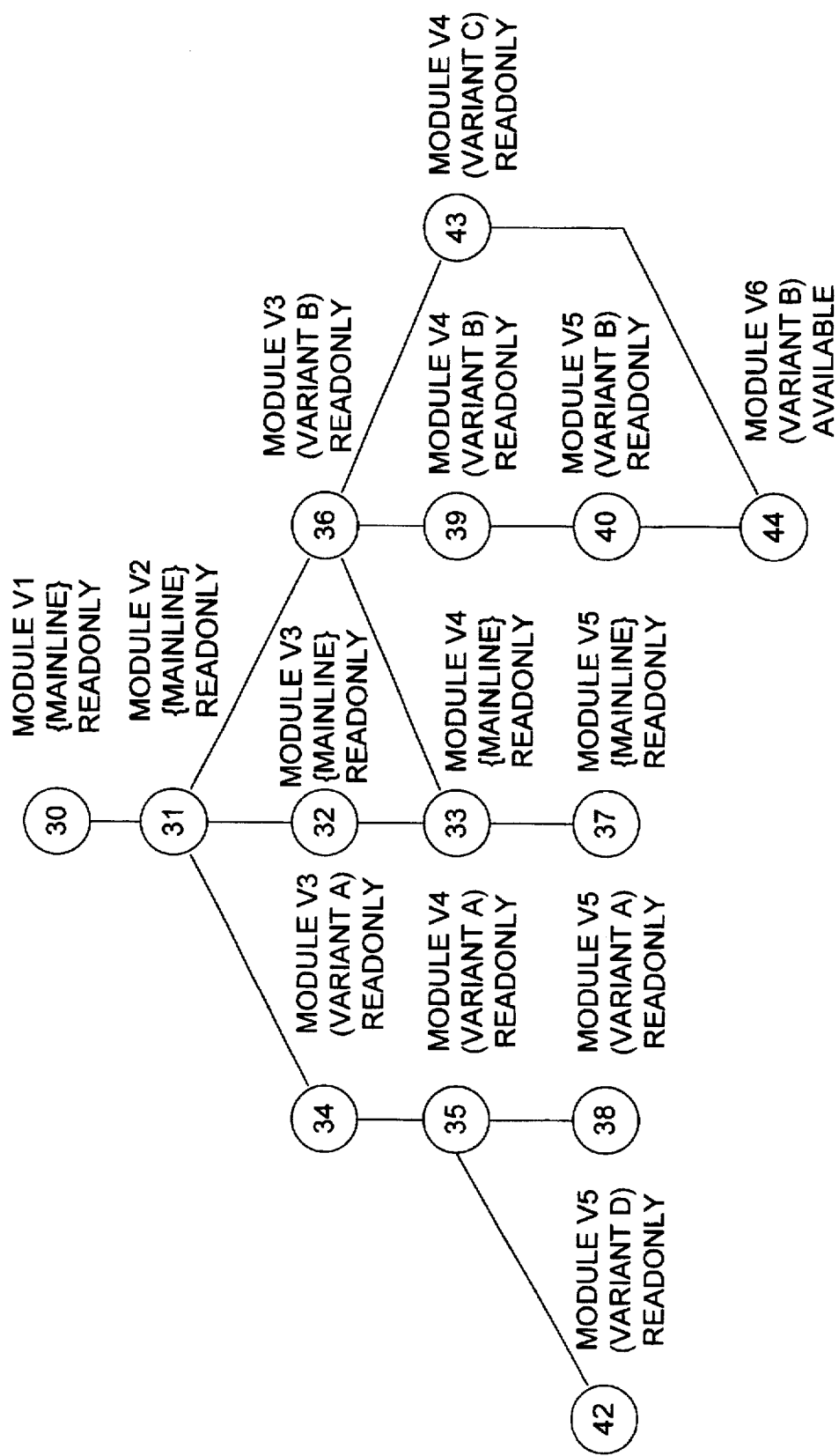
FIG. 3 is a more complex version graph on which the method of the present invention is useful in locating a versioned object.

Referring now to FIG. 3, a more complex version tree is illustrated, which tree is helpful in understanding the steps performed by the method of the present invention. Like reference numerals are used in FIG. 3 to show expansion of the version tree shown in FIG. 2. To create another variant on the mainline branch, such as module v5 (object 37), the user calls the reserve operation for module v4 [mainline] (object 33). The user defines the variant parameter of this operation as a "." (period). The reserve operation thus creates the new object 37 on the same variant branch as the object being reserved. The reserve operation sets the reserve status of the new object 37 as ghost; and, it derives the other property values for the new object from the object being reserved, i.e. module v4 [mainline] (object 33). The reserve operation also changes the reserve status of the object being reserved, module v4 [mainline] (object 33), to readOnly. To make the new object 37 visible to other users, the replace operation is called for this object. The replace operation sets the reserve status of module v5 [mainline] (object 37) to available.

Object 38 (module v5 [variantA]) is created the same way off of object 35 as object 37 was created off of object 33. In a similar manner, object 39 is created off of object 36 (module v3 [variantB], by repeating the above steps for each of the objects so created.

Object 42 (module v5 [variantD] is created off of object 35 by use of the reserve operation. However, in this case a name is assigned to the branch by defining the variant parameter as variantD. In a similar manner, objects 43 is created off of object 36 by the same reserve operation.

The user can merge an object from one variant branch into an object on a different variant branch by calling the merge operation. For example, to merge object 43 into object 40 on the variantB branch, the user calls the merge operation for module v5 [variantB] (i.e., object 40) and defines the object-ToMerge parameter as module v4 [variantC] (i.e., object 43). The merge operation creates a new object 44 (i.e., module v6 [variantB] and sets the reserve status of the new object to ghost. After the merged object 44 (module v6 [variantB]) is created, it is made available by calling the replace operation.

Figure 4A:
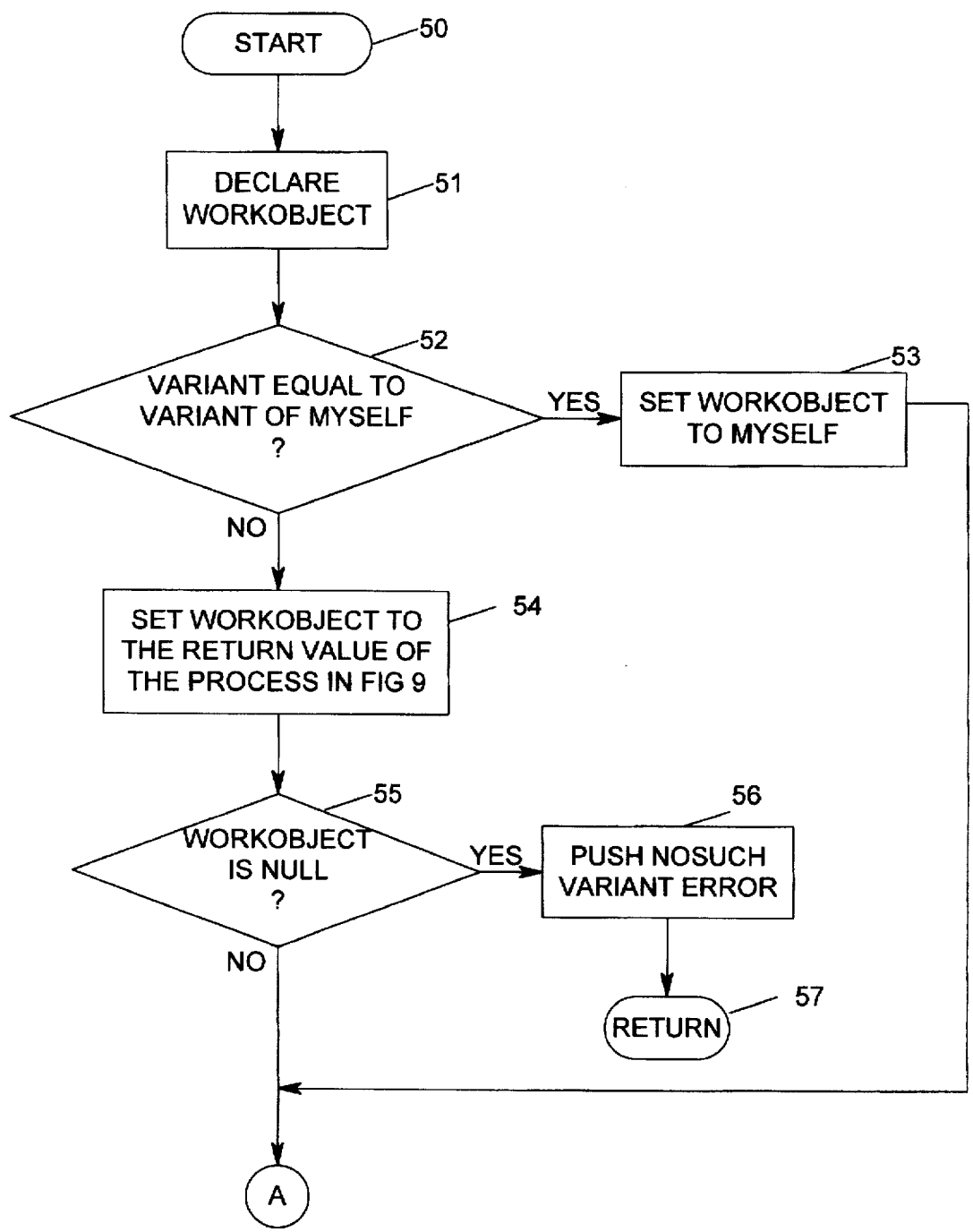
FIGS. 4A and 4B combined form a chart illustrating the operations performed in locating a versioned object.
Figure 4B:
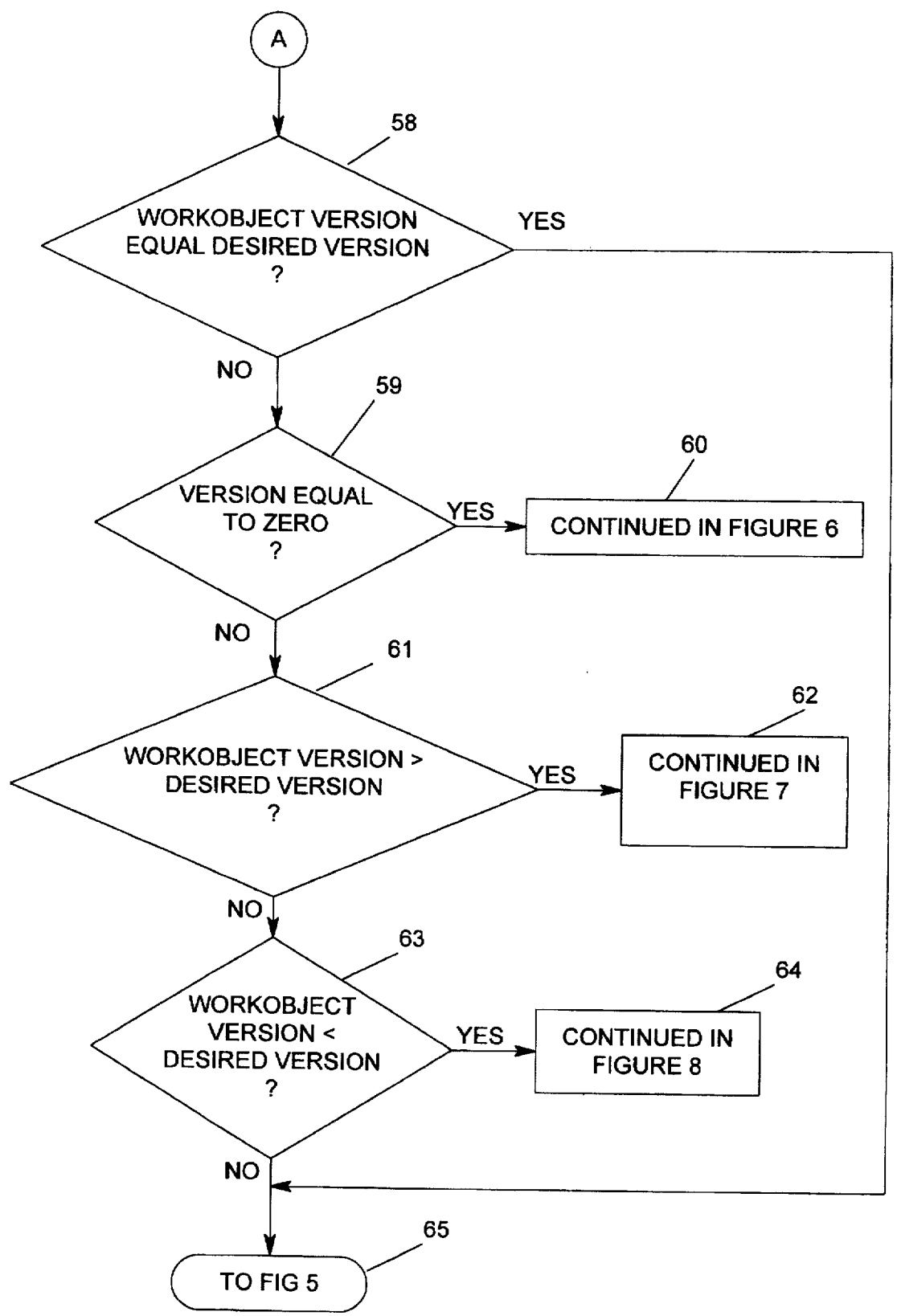
Figure 5:
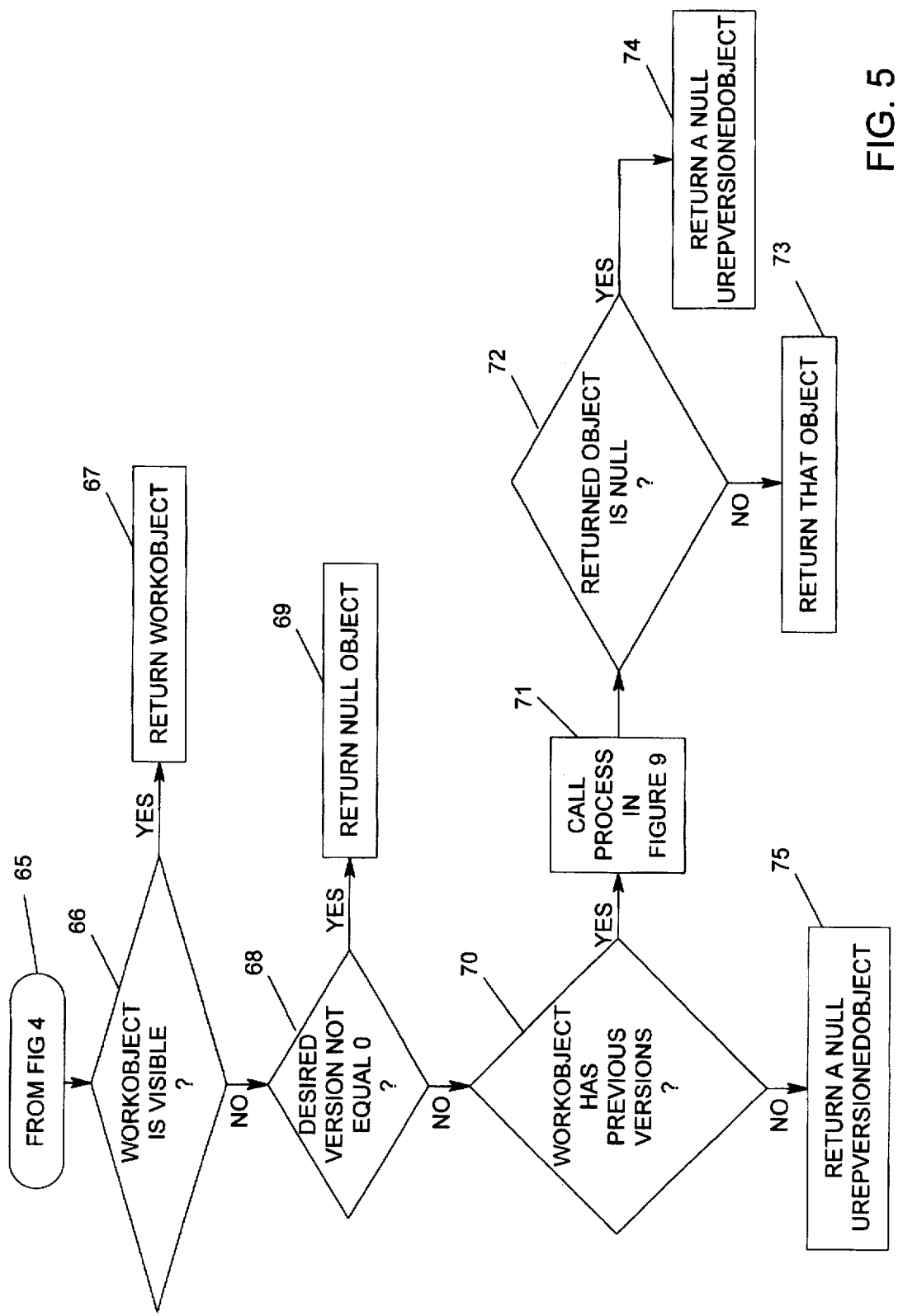
FIG. 5 is a continuation of the process illustrated in FIG. 4B.

At this juncture of the description, the details of the method of the present invention will be more fully appreciated following the description hereinbelow when taken in conjunction with FIGS. 4A through 11B. Referring now to FIG 4A, the first of a two-sheet flow chart illustrates the initial operations performed in locating a versioned object in a version tree such as that shown in FIG. 3 and described hereinabove. More specifically, the flow charts of FIGS. 4A and 4B show how a version tree is searched for a specified version. From a start bubble 50 a variable, such as workObject is declared as depicted by block 51.

Next an inquiry is made as to whether or not the variant is equal to the variant of the object on which this operation was called (e.g., myself), as depicted by a diamond 52. If the variant is equal, the workObject variable is set to myself as illustrated by a block 53. If the variant is not equal, then the workObject is set to the result of calling the findRootInternal operation (block 54), which operation will be amplified further hereinbelow with the description of FIG. 9. Following this, another inquiry is made as to whether or not the workObject is null, as represented by a diamond 55. If the workObject is null, then a noSuchVariant error is pushed on the notification stack (block 56) and the operation is exited as depicted by a Return bubble 57.

If the workObject is not Null (i.e., no exit from the diamond 55) then a branch is taken to FIG. 4B at a connector A. Another inquiry is next made as to whether or not the version number of workObject is equal to the desired version (diamond 58). If the answer is yes then the process continues with bubble 65 if FIG. 5. On the other hand, if the answer is no then yet another inquiry is made (diamond 59) as to whether or not the version of workObject is "0"(zero). If it is zero then a branch is made to the process shown in FIG. 6 and described hereinafter, which branch operation is depicted by a block 60. If it is not zero, then still another inquiry is made (diamond 61) as to whether or not the version number of workObject is greater than the version desired. If it is then a branch is made to the process illustrated in FIG. 7 and described hereinafter, which branch operation is represented by a block 62. If it is not greater than the version desired, then another inquiry is made (diamond 63) as to whether or not the version number of workObject is less than the version desired.

If the version number of workObject is less than the version desired then a branch is taken to the process shown in FIG. 8 and described hereinbelow, which branch operation is illustrated by a block 64. On the other hand if the workObject is not less than the version desired, then another inquiry is made (continued on FIG. 5 as depicted by a bubble 65) as to whether or not the workObject is visible (diamond 66). If workObject is visible then it is returned as the object desired (block 67). On the other hand if the workObject is not visible then an inquiry is made as to whether or not the desired version is not equal to zero (diamond 68). If the desired version not is equal to zero then a null object is returned (block 69). If the desired version is not not equal to zero (i.e., it is equal to zero), then another inquiry is made as to whether or not the workObject has previous versions (diamond 70).

If the workObject has previous versions, then a branch is taken to another process shown in FIG. 11 (searching UP), which branch operation is depicted by block 71. Following this step, yet another inquiry is made as to whether or not the object returned by the process of FIG. 11 is null (diamond 72). If the object returned is not a null object, then that object is returned (block 73). On the other hand if the returned object is a null object, then a null UrepVersionObject is returned, as depicted by a block 74. Also, if the workObject does not have previous versions (diamond 70 inquiry), then a null UrepversionedObject is returned.

Figure 6:
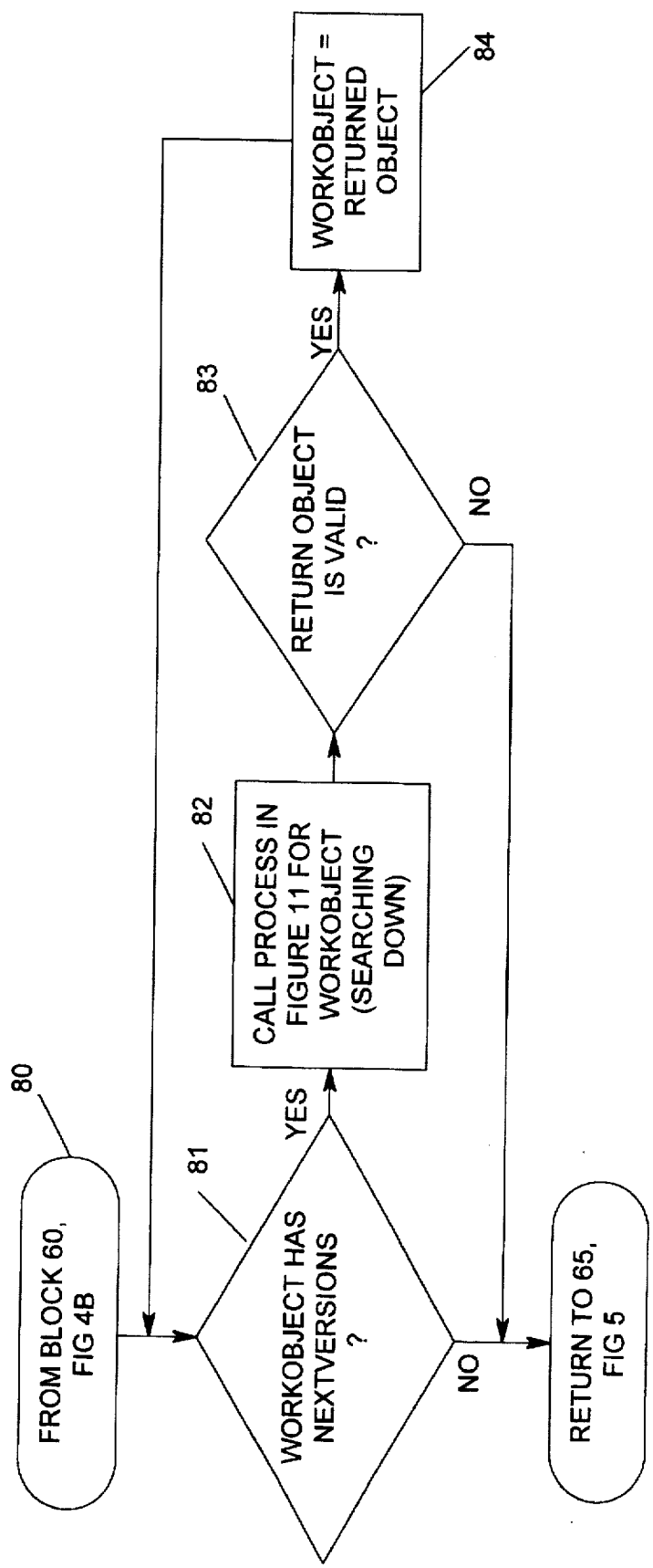
FIG. 6 is a sub-process of FIG. 4B, which illustrates the steps for locating the latest version of the versionable object.

Referring now to FIG. 6, the process step block 60 is shown in greater detail wherein the desired version is equal to zero. Beginning with a start bubble 80, an inquiry is made as to whether or not the workObject has nextVersions (diamond 81). If the answer to this inquiry is yes then the process shown in FIG. 11 for workObject is called (block 82), searching down the tree. Following this step, an inquiry is made as to whether or not the returned object is valid (diamond 83). If the answer to this inquiry is yes then the workObject is set to the returned object (block 84), with the process continuing with bubble 81. However, if the returned object is not valid then a return is made to the process shown in FIG. 5 at bubble 65.

Figure 7:
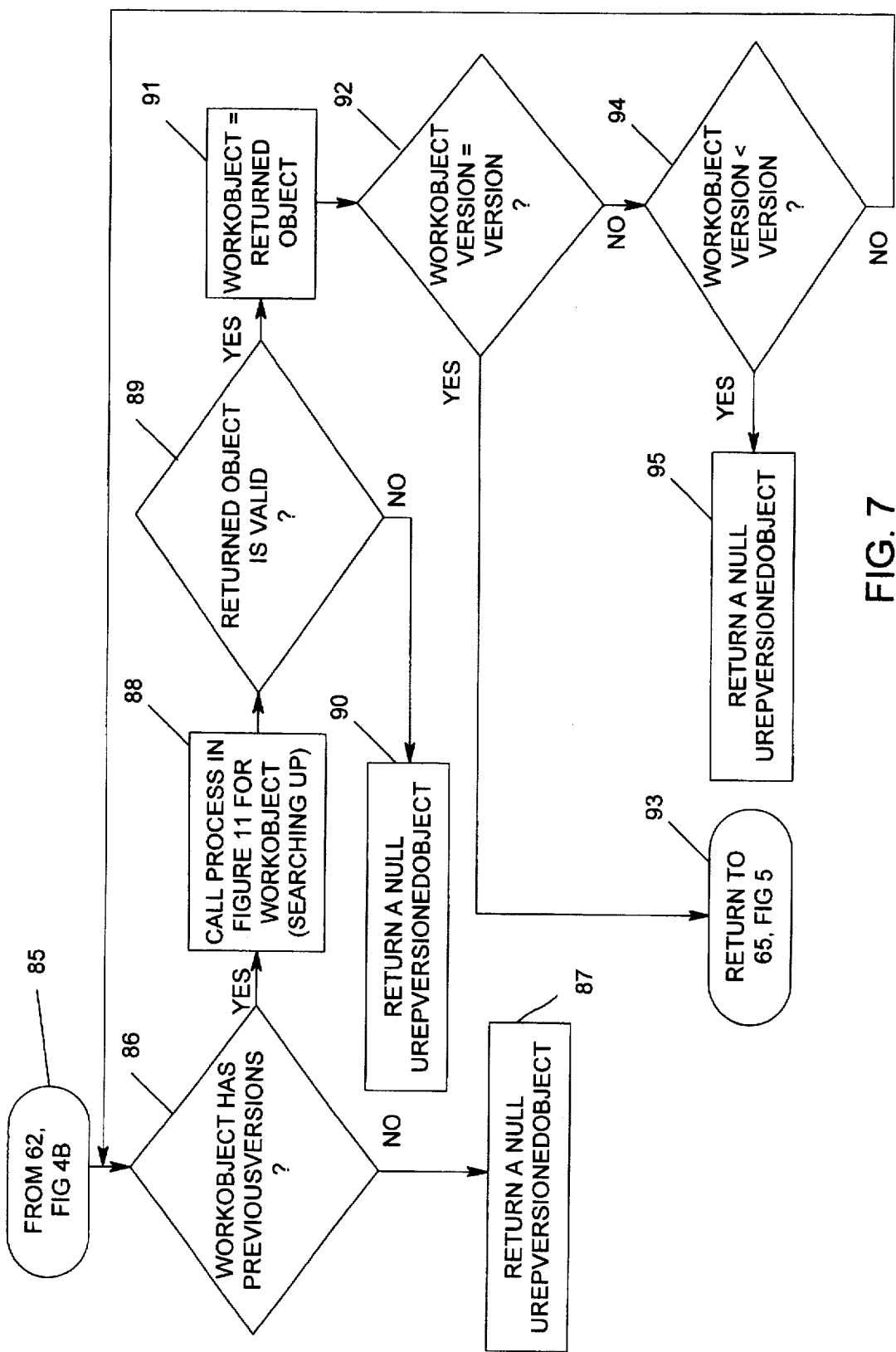
FIG. 7 is a sub-process of FIG. 4B, which illustrate the steps for locating a versioned object searching up the version tree.

Referring now to FIG. 7, a sub-process of that shown in FIG. 4B illustrates the steps for locating a versioned object searching up the version tree. The process block 62 of FIG. 4 is shown in greater detail, which process is performed if the workObject version is greater than the desired version. The process begins with a start bubble 85 followed by an inquiry as to whether or not the workObject has previous versions (diamond 86). If the answer to this inquiry is no, then a null UrepVersionedObject is returned as depicted by a process block 87. On the other hand if the workObject has previous versions, then the process of FIG. 11 for workObject is called (searching up the version tree), process block 88. Next, an inquiry is made as to whether or not the returned object is valid (diamond 89). If the returned object is not valid, then a null UrepVersionedObject is returned as depicted by a process block 90.

On the other hand if the returned object is valid, then workObject is set to the value of the returned object as depicted by a process block 91. An inquiry is next made as to whether or not the version of workObject is equal to the desired version (diamond 92), and if it is then a return is made back to the process shown in FIG. 4, as represented by a bubble 93. On the other hand, if the version of workObject is not equal to the desired version then yet another inquiry is made as to whether or not the version of workObject is less than the desired version (diamond 94). If the workObject is less than the desired version then a null UrepVersionedObject is returned (block 95). If it is not less than the desired version then a return is made back to the beginning of this sub-process at the input of the diamond 86.

Figure 8:
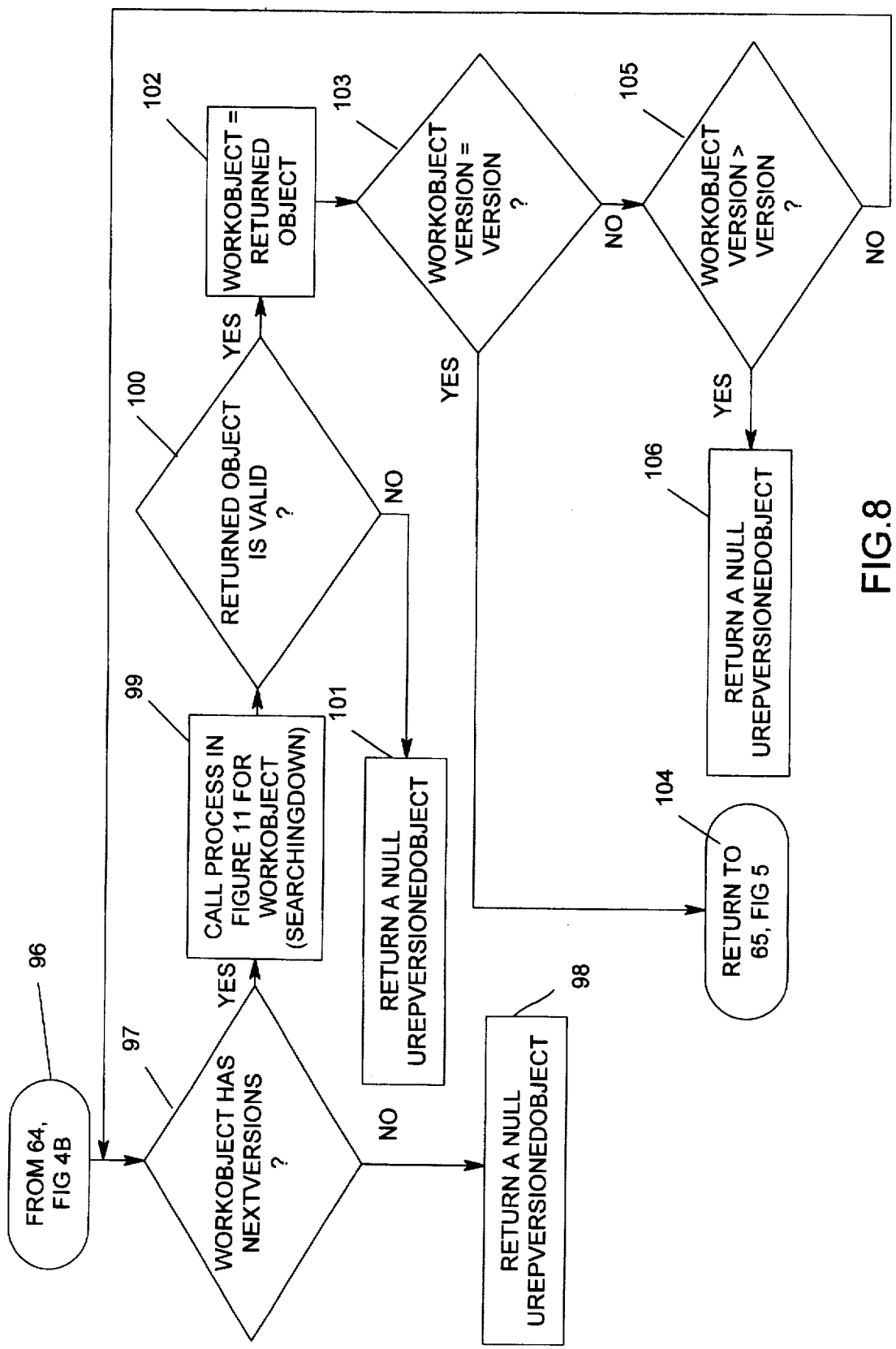
FIG. 8 is a sub-process of FIG. 4B, which illustrates the steps for locating a versioned object searching down the version tree.

Referring now to FIG. 8, another sub-process of that shown in FIG. 4B illustrates the steps for locating a versioned object searching down the version tree. The process block 64 of FIG. 4 is shown in greater detail, which process is called up if the workObject is less than the desired version. The process begins with a start bubble 96 followed by an inquiry as to whether or not the workObject has next versions (diamond 97). If the answer to this inquiry is no, then a null UrepversionedObject is returned as depicted by a process block 98. On the other hand if the workObject has next versions, then the process of FIG. 11 for workObject is called (searching down the version tree), process block 99. Next, an inquiry is made as to whether or not the returned object is valid (diamond 100). If the returned object is not valid, then a null UrepVersionedObject is returned as depicted by a process block 101.

On the other hand if the returned object is valid, then workObject is set to the value of the returned object as depicted by a process block 102. An inquiry is next made as to whether or not the version of workObject is equal to the desired version (diamond 103), and if it is then a return is made back to the process shown in FIG. 4, as represented by a bubble 104. On the other hand, if the version of workObject is not equal to the desired version then yet another inquiry is made as to whether or not the version of workObject is greater than the desired version (diamond 105). If the version of workObject is greater than the desired version then a null UrepversionedObject is returned (block 106). If it is not greater than the desired version then a return is made back to the beginning of this sub-process at the input of the diamond 97.

In summary of the processes described hereinabove, the following table provides examples of using the processes illustrated in FIGS. 4 through 8 and described hereinabove to locate objects in a version tree. It is pointed out that the pseudo code for these same processes is set forth in Appendix B hereof. The table text uses the version tree shown in FIG. 3 as the basis for defining the operation parameters and determining the object that the operation returns.

TABLE VI

| Search Desired | Operation Called | Parameters | Object Returned |
| --- | --- | --- | --- |
| Find the latest version in the version tree | findVersion | Variant: " " Version 0 | Module v5 [mainline] |
| Find the latest object of the variantA line of development | findVersion | Variant: "variantA" Version 0 | Module v5 [variantA] |
| Find version2 on the mainline of development | findVersion | Variant: " " Version 2 | Module v2 [mainline] |
| Find version 5 on the variantB line of development | findVersion | Variant: "variantB" Version 5 | Module v5 [variantB] |
| Find version4 on the variantD line of development | findVersion | Variant: "variantD" Version 4 | NULL (Results in noSuchObject error |

Figure 9A:
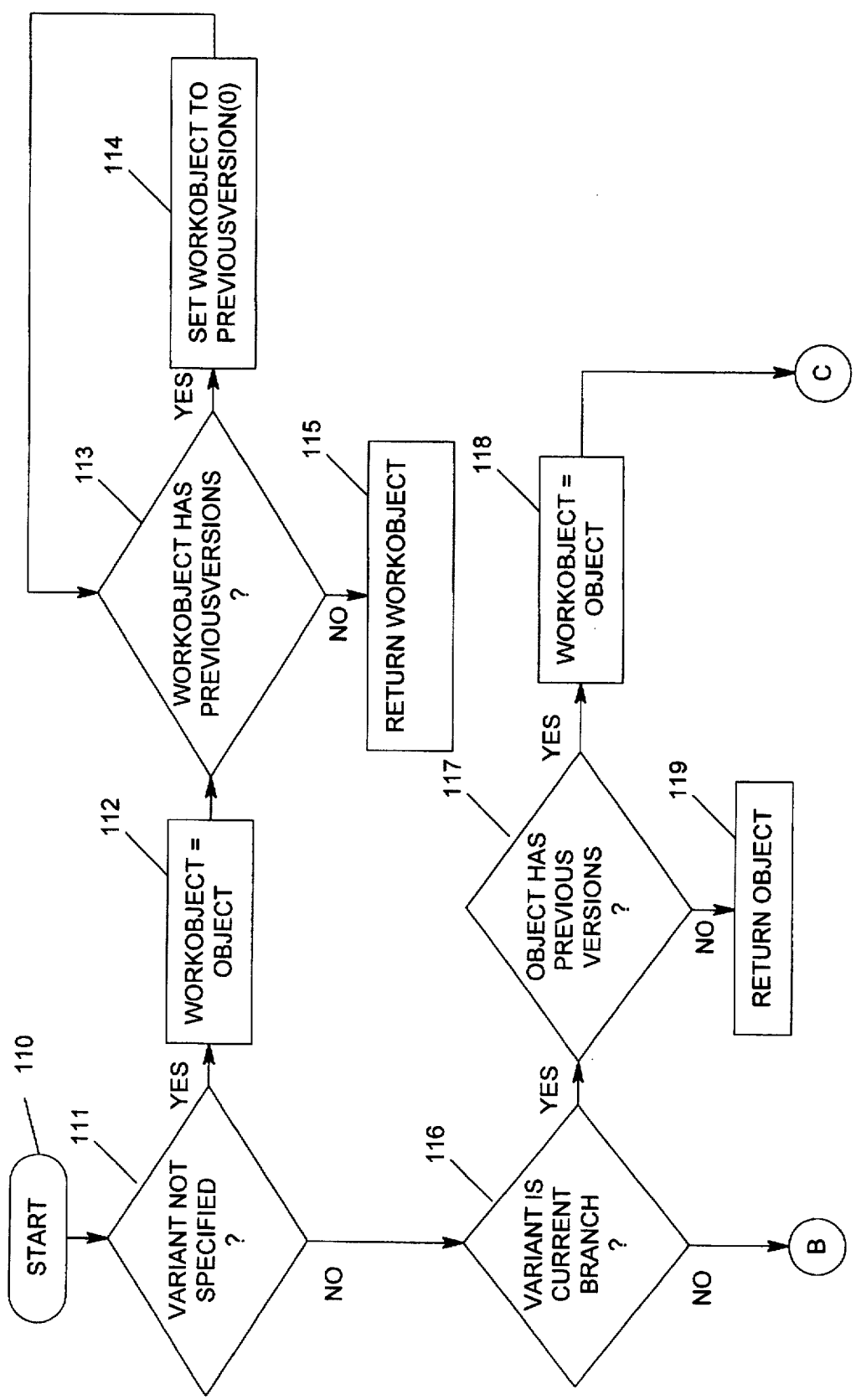
Figure 9B:
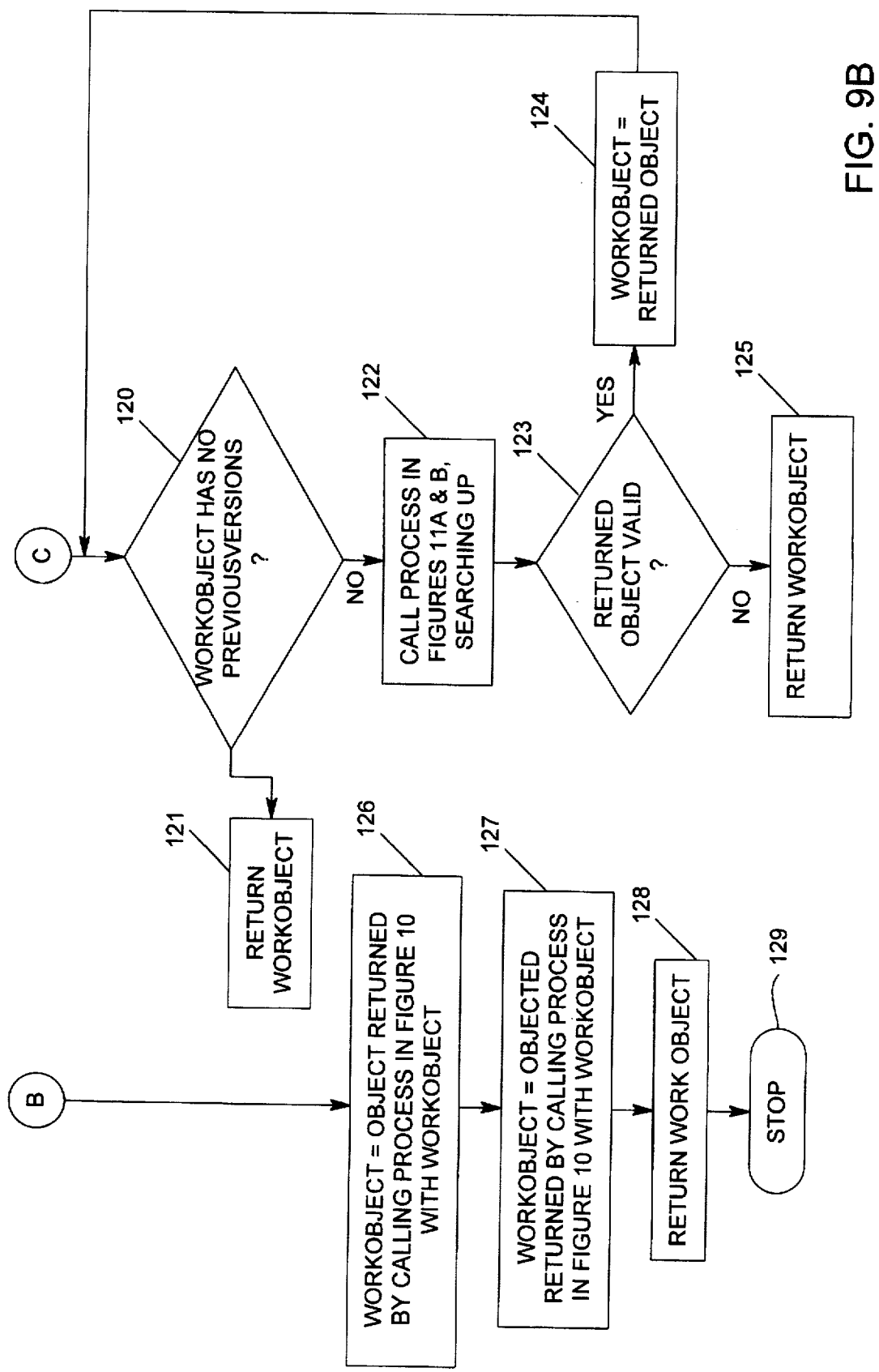

Referring now to FIGS. 9A and 9B, a combined flow chart illustrating the process for finding the root object of a version tree, or a root object of a variant branch, starting from any object in the version tree is shown. The process begins with a start bubble 110 followed by an inquiry to determine if the variant parameter is not specified (decision diamond 111). If the variant parameter is not specified then the root object of the entire tree is desired. The value of the variable workObject is set to the object for which the operation was called (i.e. myself), as depicted by a process block 112. Next, another inquiry is made as to whether or not the workObject has previous versions (i.e., the previousVersions property is null), as depicted by a decision diamond 113. If the workObject has previous versions, then the workObject is set to the first object in the previousVersions property (i.e., previousVersions(O)), process block 114. Following this step, the inquiry is again made as to whether or not workObject has previous versions (bubble 113). When a workObject is found without previous versions, then the root object is found and returned as workObject (process block 115).

Returning to the decision diamond 111, if the variant is specified (i.e., not not specified), then an inquiry is made as to whether or not the desired variant is on the current branch (decision diamond 116). That is, either the variant is equal to the version of "myself" or it is equal to ".". (Note that the symbol "." means the variant branch of the myself object.) If this is true, then another inquiry is made as to whether or not the object has previous versions (decision diamond 117). If it is not true then a connector B indicate a branch is to be taken to FIG. 9B If the "myself" object has previous versions then the value of the variable workObject is set to object (process block 118). On the other hand if the object has no previous versions then it must be the root object of the current variant branch and the object is returned (process block 119).

Following the step of setting workObject equal to object, as depicted by the process block 118, a connector C indicates that a branch is to be taken to FIG. 9B wherein yet another inquiry is made as to whether or not the workObject has no previous versions (decision diamond 120). If workObject has no previous versions it must be the root object of the variant branch, and the workObject is returned (process block 121). On the other hand, if the workObject has previous versions, then the process shown in FIG. 11 and described hereinabove is called, as represented by a process block 122. That is, a search is made up the version tree in this process step for the workObject and desired variant. Next, an inquiry is made as to whether or not the object returned is valid (decision diamond 123). If it is valid, then workObject is set equal to returned object (process block 124), and the process continues with diamond 120. If the returned object is not valid, then workObject is returned, as depicted by a process block 125. That is, since there are no previous versions for workObject with the desired variant, then it is returned as the root of the variant branch.

Figure 10:
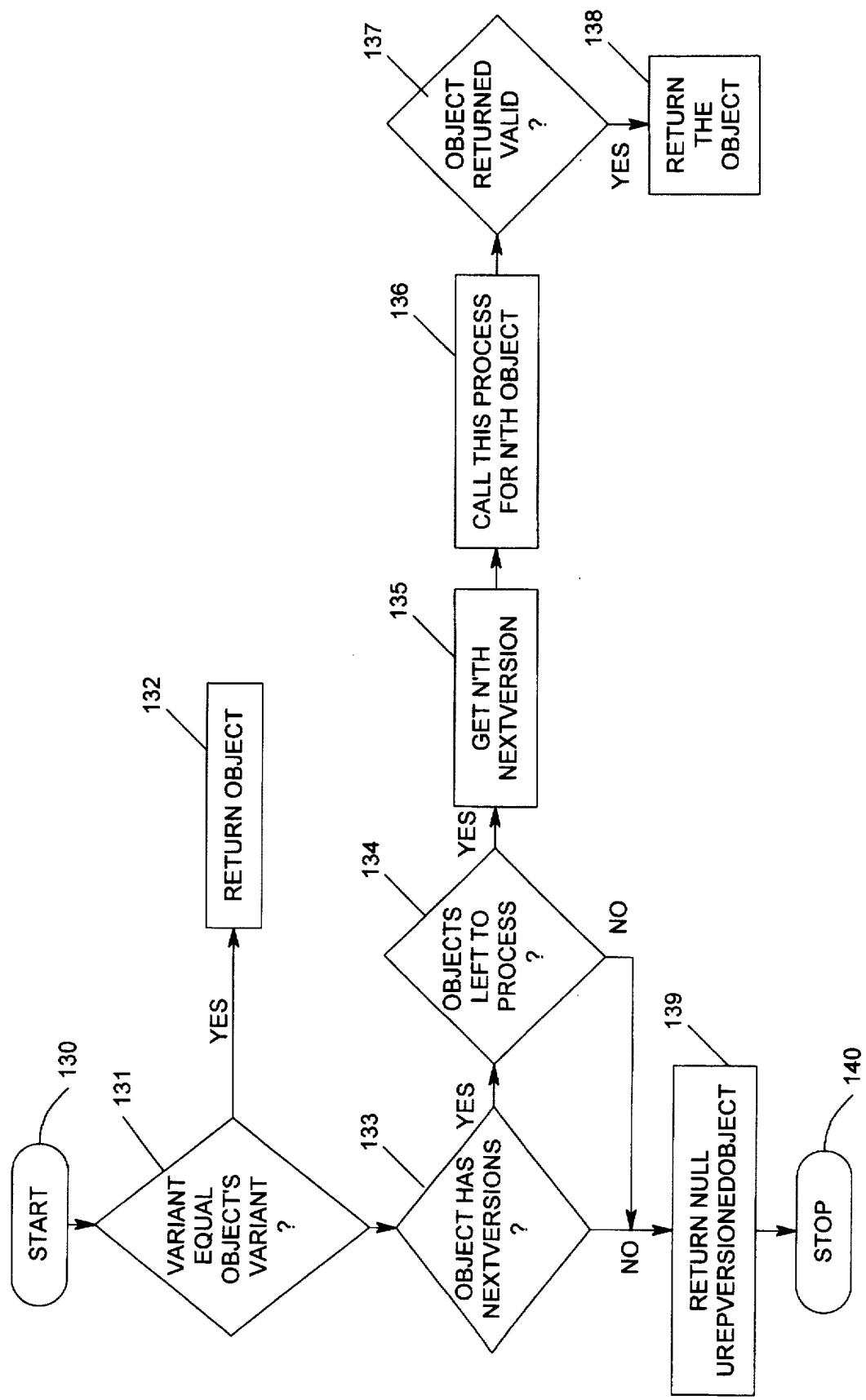
FIG. 10 is a flow chart illustrating the steps of a process for finding any variant branch in a version tree, when starting with the root object of the entire version tree.

With reference to the connector B, if the variant branch is not the current branch then call this process (block 126) with object, and a null variant. This step will find the root of the version tree, where steps 111–115 are performed). Set workObject to the value returned. Next, the process shown in FIG. 10 is called with workObject and the desired variant as parameters. Set workObject to the value returned (all as depicted by a process block 127). Following this step, the workObject is returned to the caller (process block 128), and the process is exited (stop bubble 129). The pseudo code for the above-described process is set forth in Appendix A hereof.

Referring now to FIG. 10, a process is illustrated which finds any variant branch in a version tree when started with the root object of the entire version tree. The process begins with a start bubble 130 followed by a decision diamond 131 inquiring if the desired variant is equal to the object's variant. If the answer is yes, then the object is returned (process block 132). On the other hand, if the answer is no then another inquiry is made at diamond 133 as to whether or not the object has next versions (i.e., nextVersions property is null). If the answer is yes then yet another inquiry is made at diamond 134 as to whether or not there are more objects to process. If yes, then the object is retrieved from the nextVersions property (process block 135). Next, this process (bubble 130) is called passing in the object (i.e., call this process for the n'th object-process block 136). Following this step, an inquiry is made at diamond 137 if the object returned from the previous step is valid. If no, then the fore-described steps (diamond 134, process blocks 135 and 136 and diamond 137) are repeated. The process steps in diamond 134, and blocks 135, 136 and 137 iterate over the objects in the nextVersions property. If the answer is yes, then the object found is returned (process block 138).

Referring back to the decision diamonds 133 and 134, if the answer to either of these inquiries is no, then no object was found with the desired variant, so return a null UrepVersionedObject (process block 139). The process is then exited as depicted by a stop bubble 140. The pseudo code for the above-described process is set forth in Appendix C hereof.

Figure 11A:
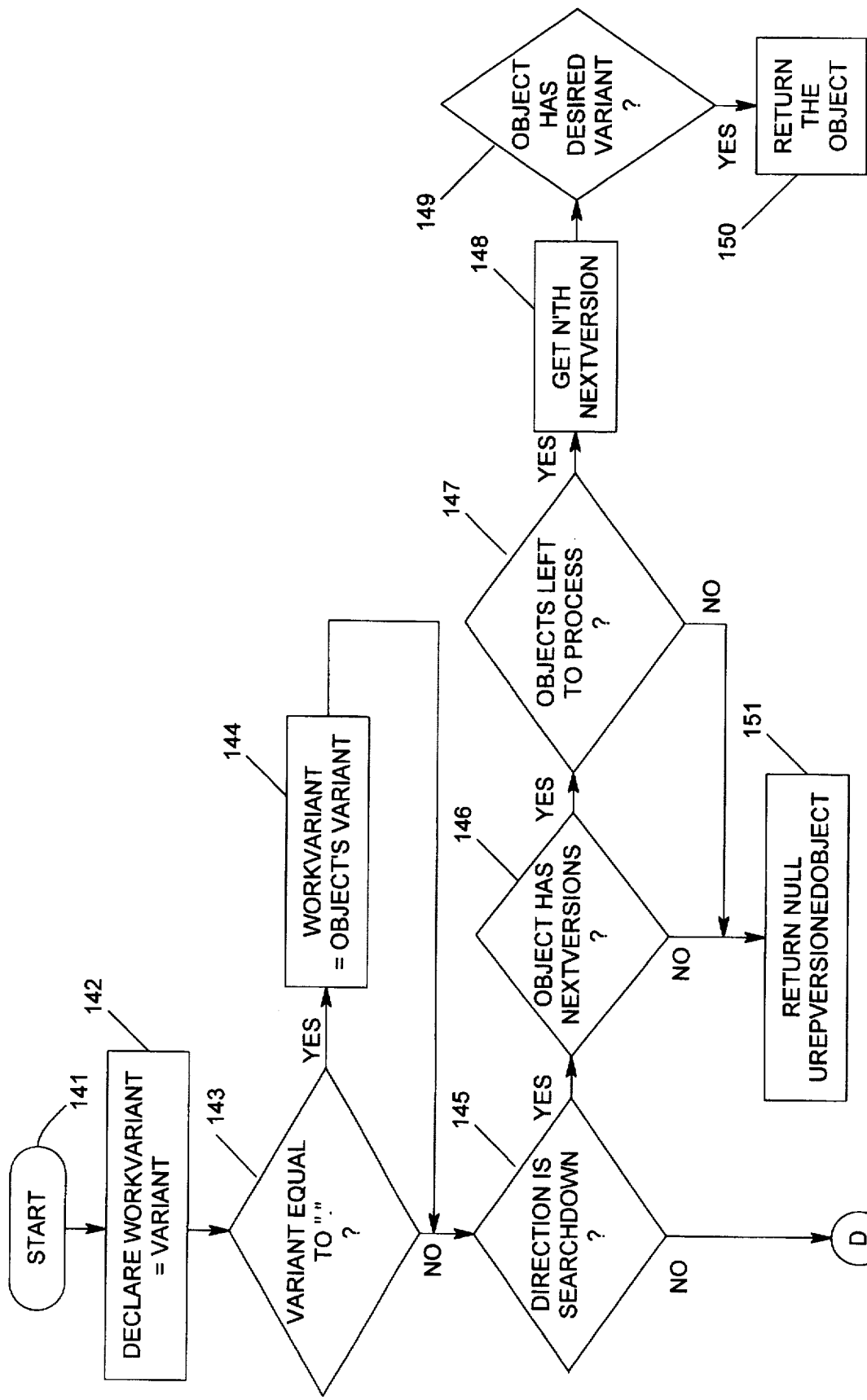
FIGS. 11A and 11B are a flow chart illustrating the steps of a process for finding the object with the given variant in either the previous versions or the next versions of an object in the version tree.
Figure 11B:
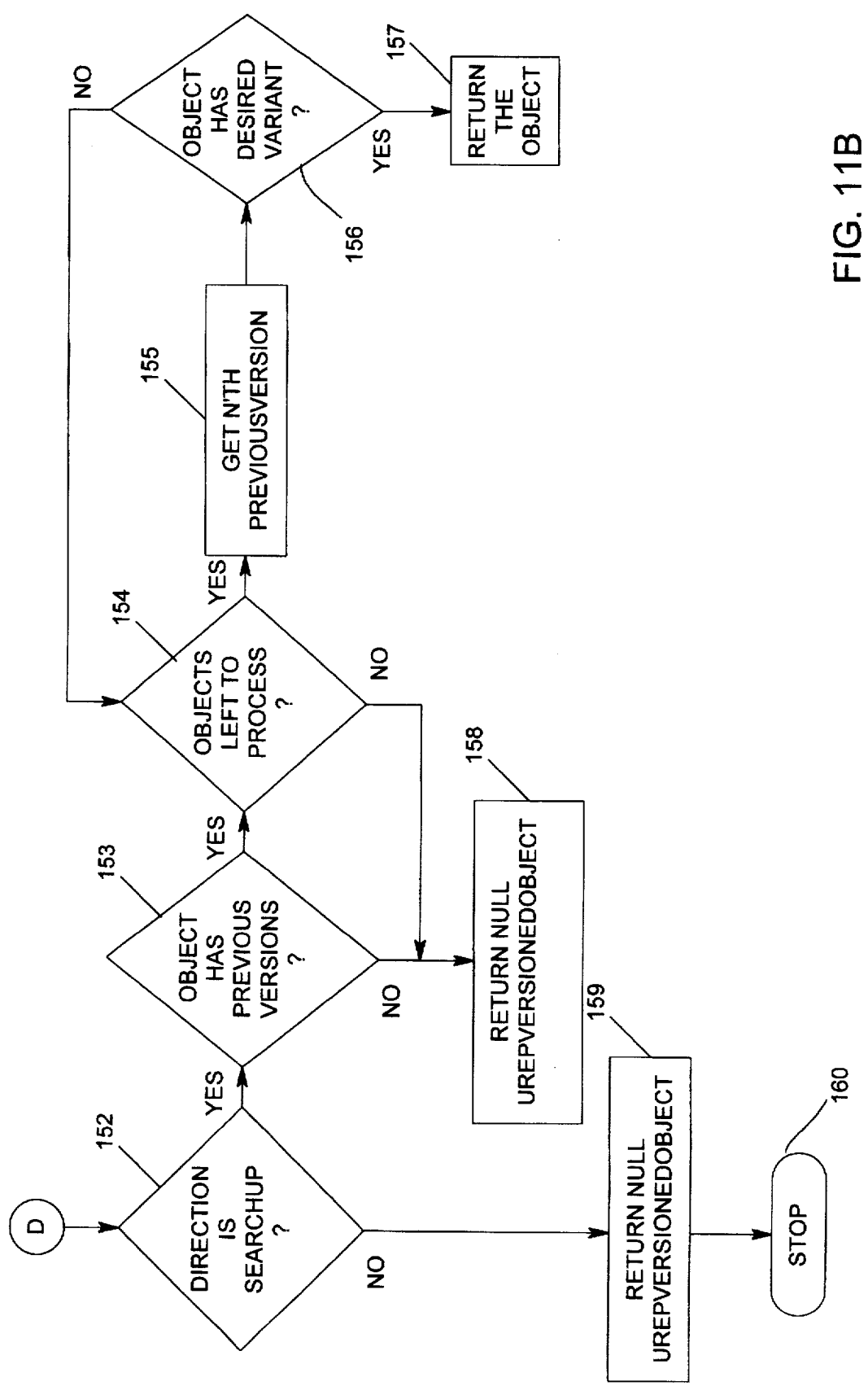

With reference now to FIG. 11A and 11B, a process is illustrated for finding the object with the given variant in either the previous versions or the next versions property of an object in the version tree. The process begins with a start bubble 141 followed by a process block 142 representing the declaring of a variable, workVariant, and setting its value to the desired variant. Next, an inquiry is made as to whether or not the variant is equal to "." (i.e., the variant of the object is what is desired —decision diamond 143). If the answer to this inquiry is yes, then the workVariant is set equal to the variant of the object (process block 144). On the other hand, if the answer is no, or after completing the process step represented by block 144, another inquiry is made as to whether or not the direction to be searched is down (decision diamond 145). If the answer to this inquiry is no, then a branch is taken to FIG. 11B at a connector D.

If the search is to be made down, then an inquiry is made as to whether or not the object has next versions (i.e., the nextVersions property is not null—decision diamond 146). If the answer to this inquiry is yes, then each object is selected in the nextVersions property. In particular, an inquiry is made as to whether or not there are more objects left to process (decision diamond 147). Next, an object is retrieved from the nextVersions property (i.e., get n'th nextVersions—process block 148). Following this, yet another inquiry is made as to whether or not the retrieved object's variant is equal to the desired variant. If the answer is yes, and the next version with the desired variant was found and this object is returned (process block 150).

If the answer to the inquiry at decision diamonds 146 and 147 are either one a no, then a null UrepVersionedObject is returned (process block 151). From the connector D an inquiry is made as to whether or not the search is to be made up the version tree. If the answer to the inquiry at decision diamond 152 is a no, then a null UrepversionedObject is also returned (process block 159). Following this step the process is exited as depicted by a stop bubble 160.

If the search is to be made up (i.e., the yes leg of the diamond 152), then an inquiry is made as to whether or not the object has next versions (i.e., the nextVersions property is not null—decision diamond 153). If the answer to this inquiry is yes, then each object is selected in the previous-Versions property. In particular, an inquiry is made as to whether or not there are more objects left to process (decision diamond 154). Next, an object is retrieved from the previousVersions property (i.e., get n'th nextVersions—process block 155). Following this, yet another inquiry is made as to whether or not the retrieved object's variant is equal to the desired variant (diamond 156). If the answer is yes, and the next version with the desired variant was found and this object is returned (process block 157). If the answer to the inquiry at decision diamonds 153 and 154 are either one a no, then a null UrepVersionedObject is returned (process block 158). The pseudo code for the above-described process is set forth in Appendix D hereof.

In summary, the following table provides examples of the use of the process shown in FIG. 9 and described hereinabove to locate objects in a version tree. The table uses the version tree shown in FIG. 3 as the basis for defining the operation parameters and determining the object that the operation returns.

TABLE VII

| Search Desired | Operation Called | Parameters | Object Returned |
|---|---|---|---|
| Find the root object of the entire tree | findRoot | Variant: " " | Module v1 [mainline] |
| Find the start of the variantB line of development | findRoot | Variant: "variantB" | Module v3 [variantB] |
| Find the start of the VariantE line of development | findRoot | Variant: "variantE" | NULL (Results in noSuchVariant) |

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

APPENDICES ~~FOR DOCKET 04MV1013~~

Appendix A findRootInternal

(fig 9)

findRootInternal (in conjunction with findRootRecurse) processing can take one of three
main paths. (1) If the Variant parameter indicates that we are seeking the root of the
whole version tree just walk up the version tree via the first parent objects encountered
(2) If we are already on the desired branch walk up the branch via parents with the
desired variant name until there is no predecessor with the desired variant name (3)
Otherwise find the root of the version tree and recursively walk down until the first object
with the desired variant name is found.

The findRootInternal operation carries out the following process:

```
/* locate a candidate object satisfying the Variant requirements
*/
declare a UrepVersionedObject workObject
workObject = this
IF Variant is NULL OR the empty string OR ""
/* looking for the root of the mainline variant or equivalently the whole version
*/
/* graph so optimize the tree walk by just recursively finding the first object in
*/
/* previousVersions                              */
{
    WHILE workObject has previousVersions
    {
        set workObject to the first member of previousVersions
    }
    RETURN workObject
}
ELSE
IF variantName of this is equal to Variant or Variant is "."
/* on the desired variant branch so just walk up the branch to the top
*/
{
    IF previousVersions of workObject is empty
```

```
                    RETURN workObject
                }
            ELSE
            {
 5              WHILE workObject has previousVersions
                {
                    tempObject = findNext{xe "FindNext:used"}(object:workObject,
        direction:searchUp, variant:variant)
                    IF tempObject is not NULL
10                  {
                        workObject = tempObject
                    }
                    ELSE
                    {
15                      RETURN workObject
                    }
                }
            }
        }
20      ELSE
        /* get to the top and recursively walk down until the desired branch is found
        */
        {
            workObject = findRootInternal{xe "findRootInternal:used"}("")
25          workObject = workObject.findBranchRecurse{xe
        "FindRootRecurse:used"}(variant:variant)
            RETURN workObject
        }

Appendix B 30  findVersion (figs 4, 5, 6, 7, and 8)

findVersion processing first positions itself to be working with some object on the
    desired variant branch. It then seeks the desired version on this branch via one of four
    possible paths (1) The work object is already the right version (2) The last version is
35  desired in which case the algorithm walks down the branch following the variant name
```

Copyright 1995, Unisys Corporation

APP-2 path until there are no more objects with the desired variant name (3) The desired version is less than that of the work object in which case the algorithm walks up the branch following the variant name path until the object with the desired version is found (or if not found and error is pushed) (4) The converse case of (3) for the desired version being greater than that of the work object. Finally, the candidate object is verified for visibility to the requester and if necessary a "better" object is found if the last version had been requested.

The findVersion operation carries out the following process:

```
    declare a UrepVersionedObject workObject

IF (Version < 0)
    {
        push error invalidVersion and RETURN NULL object{xe
"error:invalidVersion"}
    }

/* first we will get positioned on the right variant branch
    */
    IF Variant is equal to getProperty(property:variantName) OR Variant is ".")
    /* we are on the desired variant branch                      */
    {
        workObject = this
    }
    ELSE
    /* find the right variant branch first and then look for the right version
    */
    {
        workObject = findRootInternal{xe "findRootInternal:used"}(variant:variant)
        IF workObject is NULL
        {
            push error noSuchVariant{xe "error:noSuchVariant"} and RETURN
workObject
        }
    }

/* locate a candidate object which satisfies the Version parameter
    */
```

Copyright 1995, Unisys Corporation

APP-3

```
        IF versionNumber of workObject is equal to Version
        {
            /* we have a candidate already
            */
 5      }
        ELSE
        IF (Version is 0)
        /* last visible version is sought so walk down the branch as far as we can
        */
10      {
            WHILE workObject has nextVersions
            {
                tempObject = findNext{xc "findNext:used"}(object:workObject,
direction:searchDown, Variant:".")
15              IF tempObject is not NULL
                {
                    workObject = tempObject
                }
                ELSE
20              {
                    BREAK /* WHILE workObject has nextVersions */
                }
            }
        }
25      ELSE
        IF versionNumber of workObject is greater than Version
        /* have to search up the version graph
        */
        {
30          WHILE workObject has previousVersions
            {
                tempObject = findNext{xc "findNext:used"}(object:workObject,
direction:searchUp, Variant:".")
                IF tempObject is NULL
35              /* we've gone as far as we can without anything going wrong and
                */
                /* without a version match, so it just doesn't exist
                */
```

*Copyright 1995, Unisys Corporation*

ADD-4

```
                    {
                        push error noSuchObject{xe "error:noSuchObject"} and RETURN
        NULL object
                    }
                    ELSE
                    {
                        workObject = tempObject
                        IF (workObject.getProperty(property :versionNumber) == Version)
                        /* we have a candidate
                        */
                        {
                            BREAK /* WHILE workObject has previousVersions */
                        }
                        ELSE
                        IF (workObject.getProperty(property:versionNumber) < Version)
                        /* we went past the version number without getting a hit; it must
                        */
                        /* been deleted by a collapseVersionsTo
                        */
                        {
                            push error noSuchObject{xe "error:noSuchObject"} and
        RETURN NULL object
                        }
                        ELSE
                        /* we haven't gone far enough yet           */
                        {
                            /* workObject to continue with has already been set; nothing
                            */
                            /* special to do
                            */
                        }
                    }
                }
            }
        ELSE
        IF versionNumber of workObject is less than Version
        /* have to search down the version graph
        */
```

*Copyright 1995, Unisys Corporate*

APP-5

A

```
           |
           WHILE workObject has nextVersions
                {
                        tempObject = findNext{xe "findNext:used"}(object:workObject,
 5      direction:searchDown, Variant:".")
                        IF tempObject is NULL
                        /* we've gone as far as we can without anything going wrong and
                */
                        /* without a match, so it just doesn't exist
10              */
                        {
                                push error noSuchObject{xe "error:noSuchObject"} and RETURN
        NULL object
                        }
15              ELSE
                        {
                                workObject = tempObject
                                IF versionNumber of workObject is equal to Version
                                /* we have a candidate
20              */
                                {
                                        BREAK /* WHILE workObject has nextVersions */
                                }
                                ELSE
25                              IF versionNumber of workObject is greater than Version
                                /* we went past the version number without getting a hit; it must
                */
                                /* have been deleted by a collapseVersionsTo
                */
30                              {
                                        push error noSuchObject{xe "error:noSuchObject"} and
        RETURN NULL object
                                }
                                ELSE
35                              /* we haven't gone far enough yet
                */                      {
                                        /* workObject to continue with has already been set; nothing
                */
```

Copyright 1995, Unisys Corporation

APP-6

```
                            /* special to do
            */
                   }
                }
 5            }
         }

/* validate the candidate object
         */
10       IF (workObject.verifyVisibility{xe "verifyVisibility:used"}() is TRUE)
         {
              RETURN workObject
         }

15       IF (Version is not 0)
         {
              push error noSuchObject{xe "error:noSuchObject"} and RETURN NULL
         object
         }
20
         IF previousVersions of workObject is not empty
         /* last visible version is desired and the candidate is a ghost not visible to the
         */
         /* requester so we'll go back one version
25       */
         {
              tempObject = findNext{xe "findNext:used"}(object:workObject,
         direction:searchUp, Variant:".")
              IF tempObject is NULL
30            {
                   push error noSuchObject{xe "error:noSuchObject"} and RETURN NULL
         object
              }
              ELSE
35            {
                   RETURN tempObject
              }
         }
```

*Copyright 1995, Unisys Corporation*

App-7

A

```
        ELSE
        /* last visible version is desired and the candidate is a ghost not visible to the
        */
        /* requester but there is no previous version to go back to so no such object
5       */
        {
            push error noSuchObject and RETURN NULL object
        }
```

Appendix C findBranchRecurse

(fig 10)

The findBranchRecurse operation is based on the assumption that a search for the Variant branch was started at the root of the version graph. The operation determines if the object being examined is on the branch specified by the Variant parameter. The first time this is true, the object is returned. If the object is not on the specified variant branch, findBranchRecurse is invoked for each object in this object's nextVersions. If any of these calls (which of course may recursively make additional calls) returns a non-Null object, the variant branch was found and this object is returned. If none of the calls returned a non-Null object, a Null object is returned since no object on the desired variant branch was encountered.

The findBranchRecurse operation carries out the following process:

```
        IF variantName of this is equal to Variant
        {
            RETURN this
        }

IF nextVersions of this is not empty
        {
            FOR each workObject in nextVersions of this
            {
                tempObject = workObject.findBranchRecurse(xe
"findRootRecurse:used"}(variant:variant)
                IF tempObject is not NULL
                {
```

Copyright 1995, Unisys Corporation

App-8

```
                    RETURN tempObject
                }
            }
        }
5
        RETURN NULL object
```

Appendix D findNext

(This is part of fig 11.)

10   The findNext function carries out the following process:

```
        workVariant = variant
        IF (workVariant = ".")
        {
            workVariant = object.get_VariantName()
15      }
        SWITCH (direction)
        {
          CASE searchDown:
            {
20              RETURN findNextDown(object, workVariant)
            }

CASE searchUp:
            {
25              RETURN findNextUp(object, workVariant)
            }
          default:
            {
                RETURN NULL object
30          }
        }
```

A   *Copyright 1995, Unisys Corporation* findNextDown

(This is part of fig 11.)

The findNextDown function carries out the following process:

```
     IF (object.sizeOf_nextVersions() == 0)
5    {
         RETURN NULL object
     }

FOR (INTEGER cnt = 0; cnt < sizeOf_nextVersions(); cnt++)
10   {
         tempObject = get_nextVersions(cnt)
         IF (tempObject.get_variantName is equal to workVariant)
         {
             RETURN tempObject
15       }
     }

RETURN NULL object
```

20  findNextUp

(This is part of fig 11.)

The findNextUp function carries out the following process:

```
     IF (object.sizeOf_previousVersions() == 0)
     {
25       RETURN NULL object
     }

FOR (INTEGER cnt = 0; cnt < sizeOf_previousVersions(); cnt++)
     {
30       tempObject = get_previousVersions(cnt)
         IF (tempObject.get_variantName is equal to workVariant)
         {
             RETURN tempObject
```

Copyright 1995, Unisys Corporation     App-10

}
}

RETURN NULL object

What is claimed is:

1. In a computer system having a user interface, a memory, a repository and a database, a repository program operating in said computer system for accessing said database, said repository program executing a method for locating a versioned object within a version tree depicting a history of objects stored in said repository, when a desired variant and desired version are provided, said method comprising the steps of:
   a. declaring a variable workObject;
   b. if the desired variant is equal to the variant of an object on which a requesting step is called, setting said workObject to said object;
   c. if said desired variant is not equal to the variant of said object on which said requesting step is called, setting said workObject to a root object;
   d. if said workObject is null, pushing a noSuchVariant error onto a notification stack and exiting said method;
   e. if said workObject is not null, determining direction for searching said version tree using the desired version and the version of said workObject;
   f. if said workObject is visible, returning said workObject as the desired version;
   g. if said workObject is not visible and the desired version is equal to zero, determining if said workObject has previous versions;
   h if said workObject has no previous versions, returning a null object.

2. The method as in claim 1 wherein said step of determining a root object includes the steps of:
   a. if a variant parameter is not specified, setting workObject equal to object;
   b. determining if said workObject has previous versions, and if so, setting workObject equal to previous version and repeating this step until workObject has no previous versions;
   c. if said workObject has no previous versions, returning workObject;
   d. if said variant parameter is specified, determining if said desired variant is on the current branch;
   e. if said variant is on the current branch, determining if said object has previous versions, and if not, returning said object as the root object of the current variant branch;
   f. if said object has previous versions, setting value of workObject to object; and
   g. if said workObject has no previous versions, returning said workObject as the root object of the variant branch.

3. A method as in claim 2 further including the steps of:
   a. if said variant is not on the current branch, setting workObject to object returned by repeating steps a through c of claim 2;
   b. be setting workObject equal to object returned by performing the following additional steps:
      i) if said variant is equal to said object's variant, returning said object since variant branch is found;
      ii) if said variant is not equal to said variant's object, determining if said object has next versions, and if not returning a null object;
      iii) if said object has next versions, retrieving another object from nextVersions property;
      iv) repeating steps i through iii above,
      v) returning object found; and,
   c. returning workObject to caller.

4. A method as in claim 2 wherein in said step g if said workObject has previous versions, executing the following additional steps:
   a. declaring a variable workVariant and set its value to desired variant;
   b. if said desired variant is the current branch, setting workVariant equal to object's variant;
   c. searching down said version tree, to determine if said object has next versions;
   d. if said object has next versions, select each object in determining if it has desired variant; and,
   e. if said selected object has desired variant, returning said object as next version with desired variant.

5. The method as in claim 1 further including the steps of determining if said workObject is visible and if desired version is not equal to zero, returning a null object.

6. The method as in claim 2 further including the steps of determining if said workObject has previousVersions and if so, performing the following additional steps of:
   a. declaring a variable workVariant and set its value to desired variant;
   b. if said desired variant is the current branch, setting workVariant equal to object's variant;
   c. if a search is to be made up said version tree, determining if said object has previous versions;
   d. if said object has previous versions, select each object in determining if it has desired variant;
   e. if said object has desired variant, returning said object as previous version with desired variant;
   f. determining if said returned object is valid, and if so, setting workObject equal to said returned object;
   g. determining if said workObject version is equal to said desired version;
   h. if said workObject version is not equal to said desired version, determining if workObject version is greater than said desired version;
   i. if said workObject version is not greater than said desired version, repeating the steps above until a version number of workObject is found equal to the desired version.

7. The method as in claim 1 wherein said step of determining direction for searching includes the steps of determining if said version is equal to zero and if so, determining if workObject has next versions, and if so performing the following additional steps;
   a. declaring a variable workVariant and set its value to desired variant;
   b. if said desired variant is the current branch, setting workVariant equal to object's variant;
   c. if a search is to be made down said version tree, determining if said object has next versions;
   d. if said object has next versions, select each object in determining if it has desired variant;
   e. if said selected object has desired variant, returning said object as next version with desired variant;
   f. determining if said returned object is valid, and if so, setting workObject equal to said returned object.

8. The method as in claim 1 wherein said step of determining direction for searching includes the steps of determining if workObject is greater than desired version, and if so, determining if workObject has previous versions, and if so, performing the following additional steps:
   a. declaring a variable workVariant and set its value to desired variant;

b. if said desired variant is the current branch, setting workVariant equal to object's variant;
c. if a search is to be made up said version tree, determining if said object has previous versions;
d. if said object has previous versions, select each object in determining if it has desired variant;
e. if said object has desired variant, returning said object as previous version with desired variant;
f. determining if object returned is valid, and if so, setting workObject equal to said returned object;
g. if workObject version is equal to desired version, returning object; and,
h. if workObject value is not equal to desired version, determining if workObject version is less than desired version, and if so repeating steps a through h hereof.

9. The method as in claim 1 wherein said step of determining direction for searching includes the steps of determining if said workObject is less than desired version, and if so, determining if said workObject has nextVersions, and if so, performing the following additional steps of:
   a. declaring a variable workVariant and set its value to desired variant;
   b. if said desired variant is the current branch, setting workVariant equal to object's variant;
   c. if a search is to be made down said version tree, determining if said object has next versions;
   d. if said object has next versions, select each object in determining if it has desired variant;
   e. if said selected object has desired variant, returning said selected object as next version with desired variant;
   f. determining if said returned object is valid, and if so, setting workObject equal to said returned object;
   g. determining if said workObject version is equal to said desired version;
   h. if said workObject version is not equal to said desired version, determining if workObject version is greater than said desired version;
   i. if said workObject version is not greater than said desired version, repeating the steps set forth above until a version number of workObject is found equal to the desired version.

10. The method as in claim 1 wherein said workObject has previous version further includes the steps of:
    a. if a variant parameter is not specified, setting workObject equal to object;
    b. determining if said workObject has previous versions, and if so, setting workObject equal to previous version and repeating this step until workObject has no previous versions;
    c. if said workObject has no previous versions, returning workObject;
    d. if said variant parameter is specified, determining if said desired variant is the current branch;
    e. if said variant is the current branch, determining if said object has previous versions, and if not, returning said object as the root object of the current variant branch;
    f. if said object has previous versions, setting value of workObject to object; and
    g. if said workObject has no previous versions, returning said workObject as the root object of the variant branch.

11. The method as in claim 6 if said workObject is not visible and said workObject has previous versions, performing additional steps of:
    a. if said variant parameter is not specified, setting workObject equal to object;
    b. determining if said workObject has previous versions, and if so, setting workObject equal to previous version and repeating this step until workObject has no previous versions;
    c. if said workObject has no previous versions, returning workObject;
    d. if said variant parameter is specified, determining if said desired variant is the current branch;
    e. if said variant is the current branch, determining if said object has previous versions, and if not, returning said object as the root object of the current variant branch;
    f. said object has previous versions, setting value of workObject to object; and
    g. if said workObject has no previous versions, returning said workObject as the root object of the variant branch.

12. In a computer system having a user interface, a memory, a repository and a database, a repository program operating in said computer system for accessing said database, said repository program executing a method for locating a versioned object within a version tree depicting a history of objects stored in said repository, when a desired variant and desired version are provided, said method comprising the steps of:
    a. declaring a variable workObject;
    b. if the desired variant is equal to the variant of an object on which a requesting step is called, setting said workObject to said object;
    c. if said desired variant is not equal to the variant of said object on which said requesting step is called, setting said workObject to a root object;
    d. if said workObject is null, pushing a noSuchVariant error onto a notification stack and exiting said method;
    e. if said workObject is not null, determining direction for searching said version tree using the desired version and the version of said workObject;
    f. if said workObject is visible, returning said workObject as the desired version;
    g. if said workObject is not visible and the desired version is equal to zero, determining if said workObject has previous versions;
    h. if said workObject has no previous versions, returning a null object;
    i. if said workObject is not visible and said workObject has previous versions, performing additional steps of:
       1) if said variant parameter is not specified, setting said workObject equal to object;
       2) determining if said workObject has previous versions, and if so, setting said workObject equal to previous version and repeating this step until said workObject has no previous versions;
       3) if said workObject has no previous versions, returning said workObject;
       4) if said variant parameter is specified, determining if said desired variant is the current branch;
       5) if said variant is the current branch, determining if said object has previous versions, and if not, returning said object as the root object of the current variant branch;
       6) if said object has previous versions, setting value of said workObject to object; and
       7) if said workObject has no previous versions, returning said workObject as the root object of the variant branch.

13. A process as in claim 12 wherein in said step i.7. if said workObject has previous versions, executing additional steps of:
   a. declaring a variable workVariant and set its value to desired variant;
   b. if said desired variant is the current branch, setting workVariant equal to object's variant;
   c. if a search is to be made up said version tree, determining if said object has previous versions;
   d. if said object has previous versions, select each object in determining if it has desired variant; and,
   e. if said selected object has desired variant, returning said selected object as previous version with desired variant.

14. The method as in claim 12 wherein said step of determining direction for searching includes the steps of determining if said version is equal to zero and if so, determining if workObject has next versions, and if so performing the following additional steps of:
   a. declaring a variable workVariant and set its value to desired variant;
   b. if said desired variant is the current branch, setting workVariant equal to object's variant;
   c. if a search is to be made down said version tree, determining if said object has next versions;
   d. if said object has next versions, select each object in determining if it has desired variant;
   e. if said selected object has desired variant, returning said selected object as next version with desired variant;
   f. determining if said returned object is valid, and if so, setting workObject equal to said returned object.

15. The method as in claim 12 wherein said step of determining direction for searching includes the steps of determining if workObject is greater than desired version, and if so, determining if workObject has previous versions, and if so, performing the following additional steps:
   a. declaring a variable workVariant and set its value to desired variant;
   b. if said desired variant is the current branch, setting workVariant equal to object's variant;
   c. if a search is to be made up said version tree, determining if said object has previous versions;
   d. if said object has previous versions, select each object in determining if it has desired variant;
   e. if said selected object has desired variant, returning said selected object as previous version with desired variant;
   f. determining if object returned is valid, and if so, setting workObject equal to said returned object;
   g. if workObject version is equal to desired version, returning object; and,
   h. if workObject version is not equal to desired version, determining if workObject version is less than desired version, and if so repeating steps a through h hereof.

16. The method as in claim 12 wherein said step of determining direction for searching includes the steps of determining if said workObject is less than desired version, and if so, determining if said workObject has nextVersions, and if so, performing the following additional steps of:
   a. declaring a variable workVariant and set its value to desired variant;
   b. if said desired variant is the current branch, setting workVariant equal to object's variant;
   c. if a search is to be made down said version tree, determining if said object has next versions;
   d. if said object has next versions, select each object in determining if it has desired variant;
   e. if said selected object has desired variant, returning said selected object as next version with desired variant;
   f. determining if said returned object is valid, and if so, setting workObject equal to said returned object;
   g. determining if said workObject version is equal to said desired version;
   h. if said workObject version is not equal to said desired version, determining if workObject version is greater than said desired version;
   i. if said workObject version is not greater than said desired version, repeating the steps above until a version number of workObject is found equal to the desired version.

* * * * *